(12) United States Patent
Siddhartha et al.

(10) Patent No.: US 11,631,106 B2
(45) Date of Patent: Apr. 18, 2023

(54) APPARATUS, COMPUTER-IMPLEMENTED METHOD, AND COMPUTER PROGRAM PRODUCT FOR PROGRAMMATICALLY SELECTING A USER SURVEY DATA OBJECT FROM A SET OF USER SURVEY DATA OBJECTS AND FOR SELECTING RANKING MODEL(S) FOR UTILIZATION BASED ON SURVEY ENGAGEMENT DATA ASSOCIATED WITH THE SELECTED USER SURVEY DATA OBJECT

(71) Applicant: Thrive Market, Inc., Los Angeles, CA (US)

(72) Inventors: Pradyumna Siddhartha, Marina Del Rey, CA (US); Mohammad Sabah, San Pedro, CA (US); Qiqi Ai, Gardena, CA (US); Mo Lin, Los Angeles, CA (US); Aakash Pathak, Marina Del Rey, CA (US)

(73) Assignee: Thrive Market, Inc., Los Angeles, CA (US)

( * ) Notice: Subject to any disclaimer, the term of this patent is extended or adjusted under 35 U.S.C. 154(b) by 0 days.

(21) Appl. No.: 17/139,904

(22) Filed: Dec. 31, 2020

(65) Prior Publication Data
US 2022/0207557 A1 Jun. 30, 2022

(51) Int. Cl.
G06Q 30/02 (2012.01)
G06Q 30/0242 (2023.01)
G06Q 30/0217 (2023.01)
G06Q 30/0251 (2023.01)

(52) U.S. Cl.
CPC ..... *G06Q 30/0245* (2013.01); *G06Q 30/0218* (2013.01); *G06Q 30/0269* (2013.01)

(58) Field of Classification Search
CPC .......... G06Q 30/0245; G06Q 30/0269; G06Q 30/0218; G06Q 30/0203; G06Q 10/1053; G06Q 50/01; G06Q 30/02; G06Q 30/0204; G06Q 30/0217; G06Q 50/20; G06Q 10/101; G06Q 10/107; G06Q 30/0201; G06Q 30/0205; G06Q 30/0241; G06Q 30/0242; G06Q 30/0246; G06Q 30/0251;
(Continued)

(56) References Cited

U.S. PATENT DOCUMENTS

2011/0125783 A1* 5/2011 Whale ................ G06F 16/435
707/769
2016/0342902 A1* 11/2016 Pinckney ............... G06Q 30/02
(Continued)

*Primary Examiner* — Chinyere Mpamugo
(74) *Attorney, Agent, or Firm* — Alston & Bird LLP

(57) ABSTRACT

Embodiments of the present disclosure provide mechanisms for selection of a user survey data object from a set of user data objects, and processing of survey engagement data associated with a selected user survey data object. The user survey data object selected is appropriate for providing associated with a particular user data object, and the survey engagement data received associated therewith enables programmatic selection and use of particular ranking model(s) for use in generating and providing an output ranked item data object set. Example embodiments utilize selected ranking model(s) of a set of ranking models to programmatically generate and output an output ranked item data object set for a particular user profile.

18 Claims, 11 Drawing Sheets

(58) Field of Classification Search
CPC ........ G06Q 30/08; G06Q 50/00; G06Q 50/12; G06Q 30/0207–0277; H04W 4/02
See application file for complete search history.

(56) References Cited

U.S. PATENT DOCUMENTS

| | | | |
|---|---|---|---|
| 2018/0268458 A1* | 9/2018 | Popa | G06K 9/00288 |
| 2021/0182934 A1* | 6/2021 | Semarjian | G06Q 30/0631 |

* cited by examiner

APPARATUS, COMPUTER-IMPLEMENTED METHOD, AND COMPUTER PROGRAM PRODUCT FOR PROGRAMMATICALLY SELECTING A USER SURVEY DATA OBJECT FROM A SET OF USER SURVEY DATA OBJECTS AND FOR SELECTING RANKING MODEL(S) FOR UTILIZATION BASED ON SURVEY ENGAGEMENT DATA ASSOCIATED WITH THE SELECTED USER SURVEY DATA OBJECT

TECHNOLOGICAL FIELD

Embodiments of the present disclosure generally relate to software application systems that are configured for enabling selection of user survey data object(s) that are configured to trigger receipt of survey engagement data. Such software application systems are further configured to process survey engagement data and to select particular ranking model(s) for generating one or more ranked item data object set(s).

BACKGROUND

Software applications and associated software platforms are configured to support a variety of user interfaces that are configured to drive user interactions that may be stored as user engagement data. Such user engagement data may be parsed or analyzed for a variety of purposes. Applicant has discovered problems associated with generating and analyzing user engagement data in software platforms. Through applied effort, ingenuity, and innovation, Applicant has solved many of these identified problems by developing solutions embodied in the present disclosure, which are described in detail below.

BRIEF SUMMARY

In general, embodiments of the present disclosure herein describes an item data object ranking system that is configured to enable particular user survey data object selection and to enable selection of particular ranking models that are configured to generate output ranked item data object set(s). Other implementations for item data object ranking systems will be, or will become, apparent to one with skill in the art upon examination of the following figures and detailed description. It is intended that all such additional implementations be included within this description be within the scope of the disclosure, and be protected by the following claims.

In accordance with a first aspect of the present disclosure, a computer-implemented method is provided. The computer-implemented method may be executed via any of a myriad of computing devices embodied in hardware, software, firmware, and/or a combination thereof as described herein.

In at least one example embodiment of the present disclosure, the example computer-implemented method includes receiving a user survey selection request from a client device associated with a user profile identifier. The example computer-implemented method further includes programmatically selecting a user survey data object from a set of user survey data objects based on user constraints associated with the user profile identifier. The example computer-implemented method further includes causing rendering of an engageable survey interface to the client device based on the selected user survey data object. The example computer-implemented method further includes receiving survey engagement data generated in response to user engagement with the engageable survey interface. The example computer-implemented method further includes programmatically selecting a ranking model from a set of ranking models based on the survey engagement data. The example computer-implemented method further includes programmatically generating, for each item data object of an item data object set, a model-based score based at least on the selected ranking model.

The example computer-implemented method further includes programmatically identifying a candidate ranked item data object set from the item data object set based on the model-based scores. The example computer-implemented method further includes programmatically applying a user-defined filter to the candidate ranked item data object set to generate an output ranked item data object set. The example computer-implemented method further includes outputting the output ranked item data object set to the client device.

Additionally or alternatively, in some example embodiments of the example computer-implemented method, the user survey data object comprises a first survey section data object comprising a first survey inquiry data object set and a second survey section data object comprising a second survey inquiry data object set, and the computer-implemented method further includes receiving second survey engagement data associated with the second survey inquiry data object set, the second survey engagement data generated in response to user engagement with the engageable survey interface; programmatically selecting a second ranking model from a set of ranking models based on the survey engagement data; programmatically generating, for each item data object of a second item data object set, a second model-based score based on the selected ranking model; programmatically identifying a second candidate ranked item data object set from the second item data object set based on the model-based scores; programmatically applying the user-defined filter to the second candidate ranked item data object set to generate an output ranked item data object set; and outputting the second output ranked item data object set to the client device.

Additionally or alternatively, in some example embodiments of the example computer-implemented method, programmatically selecting the user survey data object from the set of user survey data objects based on the user constraints associated with the user profile identifier includes identifying user preferences data associated with the user profile identifier; and programmatically generating the user survey data object including at least one survey inquiry data object associated with an unknown user preferences data based on the user preferences data. Additionally or alternatively, in some such example embodiments of the example computer-implemented method, the example computer-implemented method further includes altering the output ranked item data object set based on the user preferences data associated with the user profile identifier.

Additionally or alternatively, in some example embodiments of the example computer-implemented method, the computer-implemented method further includes a plurality of survey engagement data comprising the survey engagement data, each survey engagement data in the plurality of survey engagement data associated with a survey inquiry data object of the user survey data object, and identifying the candidate ranked item data object set from the item data object set based at least on the model-based scores includes, for each survey engagement data of the plurality of survey engagement data: identifying the selected ranking model based on the survey engagement data; programmatically generating a model-based score set comprising, for each item data object of the item data object set, the model-based score based on the selected ranking model; and storing the model-based score set in a set of model-based score sets; and generating the output ranked item data object set by merging each model-based score set in the set of model-based score sets.

Additionally or alternatively, in some such example embodiments of the example computer-implemented method, the plurality of survey engagement data comprises first survey engagement data and second survey engagement data, and wherein the first survey engagement data is associated with a first ranking model of a first model type and the second survey engagement data is associated with a second ranking model of a second model type.

Additionally or alternatively, in some example embodiments of the example computer-implemented method, the computer-implemented method further includes receiving, from the client device, user selection of at least one item data object from the output ranked item data object; and updating a user-selected set of item data objects associated with the user profile identifier based on user selection of at least one item data object. Additionally or alternatively, in some such example embodiments of the example computer-implemented method, the example computer-implemented method further includes receiving, from the client device, a user request for item purchasing before completion of the customized user survey data; and initiating a purchase transaction associated with each item represented in the user-selected set of item data objects.

In accordance with a second aspect of the present disclosure, an apparatus is provided. In some example embodiments, the example apparatus includes at least one processor and at least one memory having computer-coded instructions stored thereon. The computer-coded instructions, in execution with the at least one processor, configures the apparatus to perform any one of the example computer-implemented methods described herein. In another example embodiment, the example apparatus includes means for performing each step of any one of the example computer-implemented methods described herein.

In accordance with a third aspect of the present disclosure, a computer program product is provided. In some example embodiments, the example computer program product includes at least one non-transitory computer readable storage medium having computer program code stored thereon. The computer program code, in execution with at least one processor, configures the at least one processor for performing any one of the example computer-implemented methods described herein.

BRIEF DESCRIPTION OF THE DRAWINGS

Figure 1:
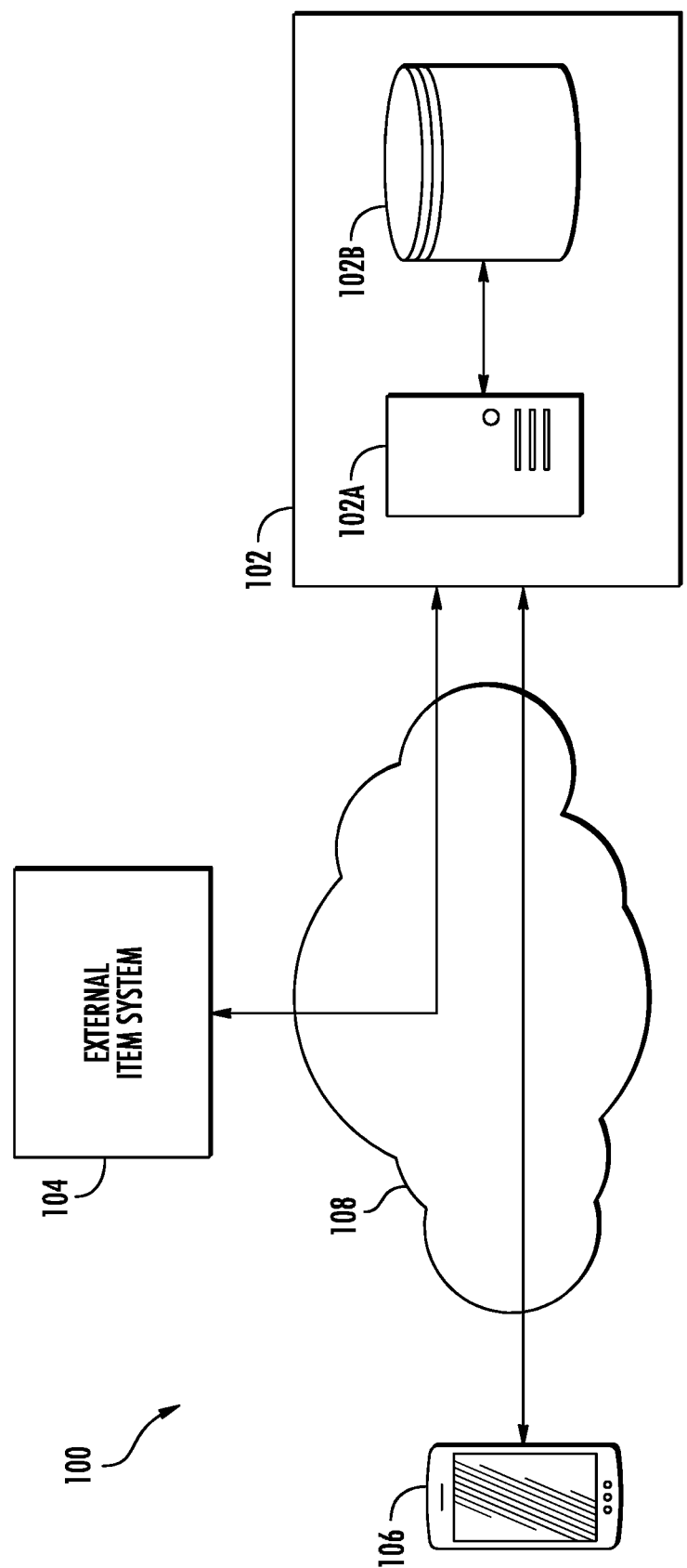
Figure 2:
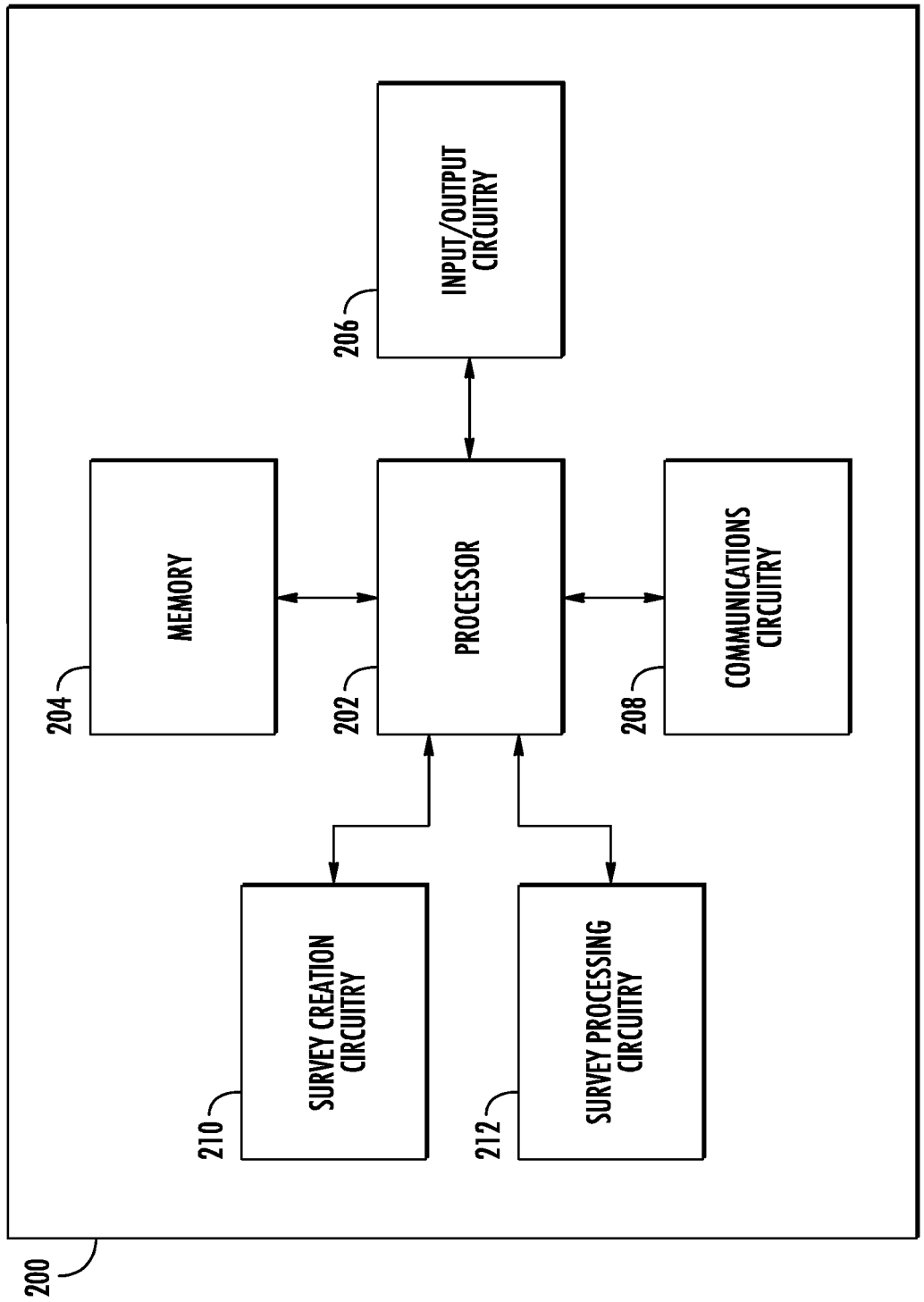
Figure 3:
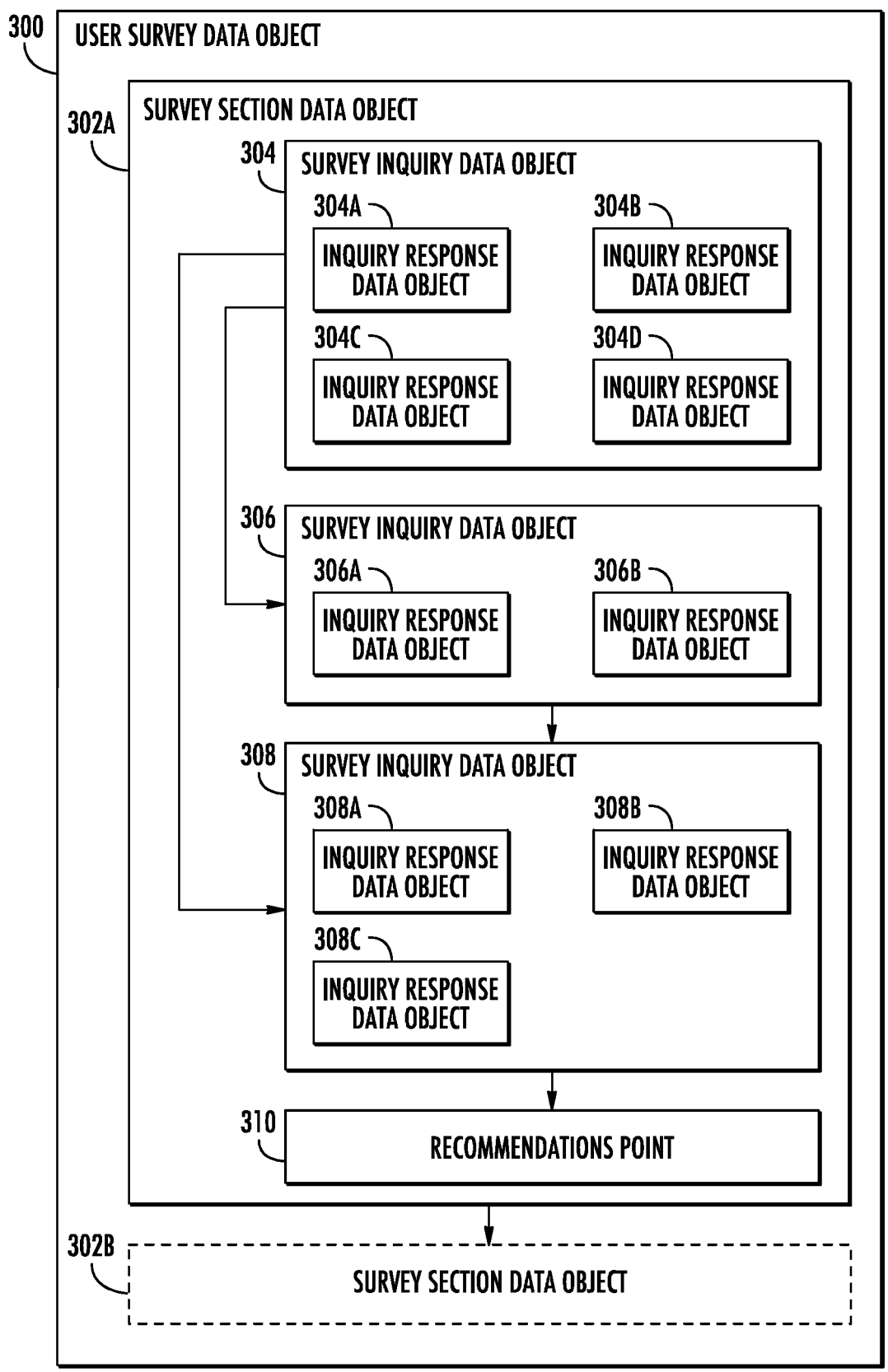
Figure 4:
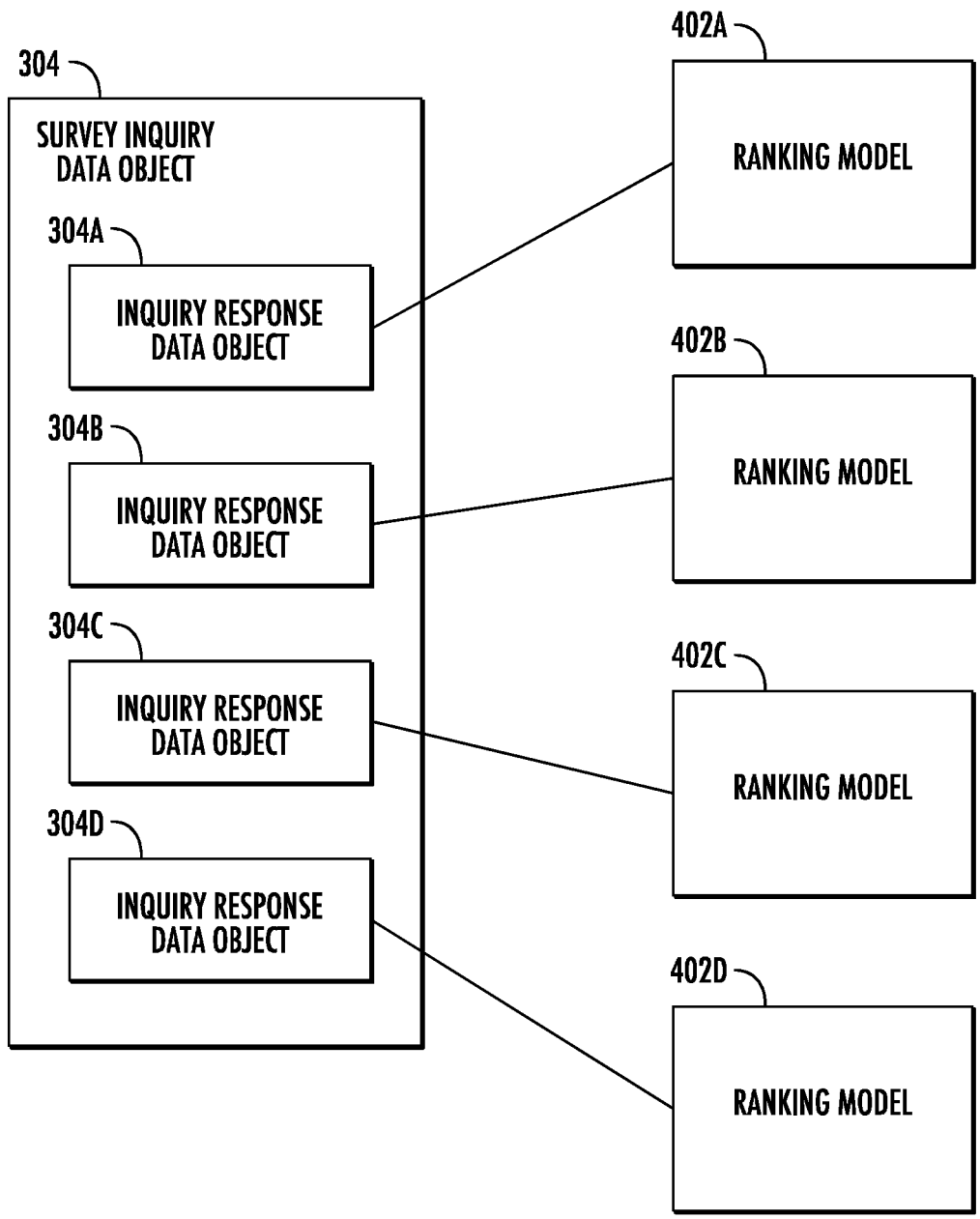
Figure 5:
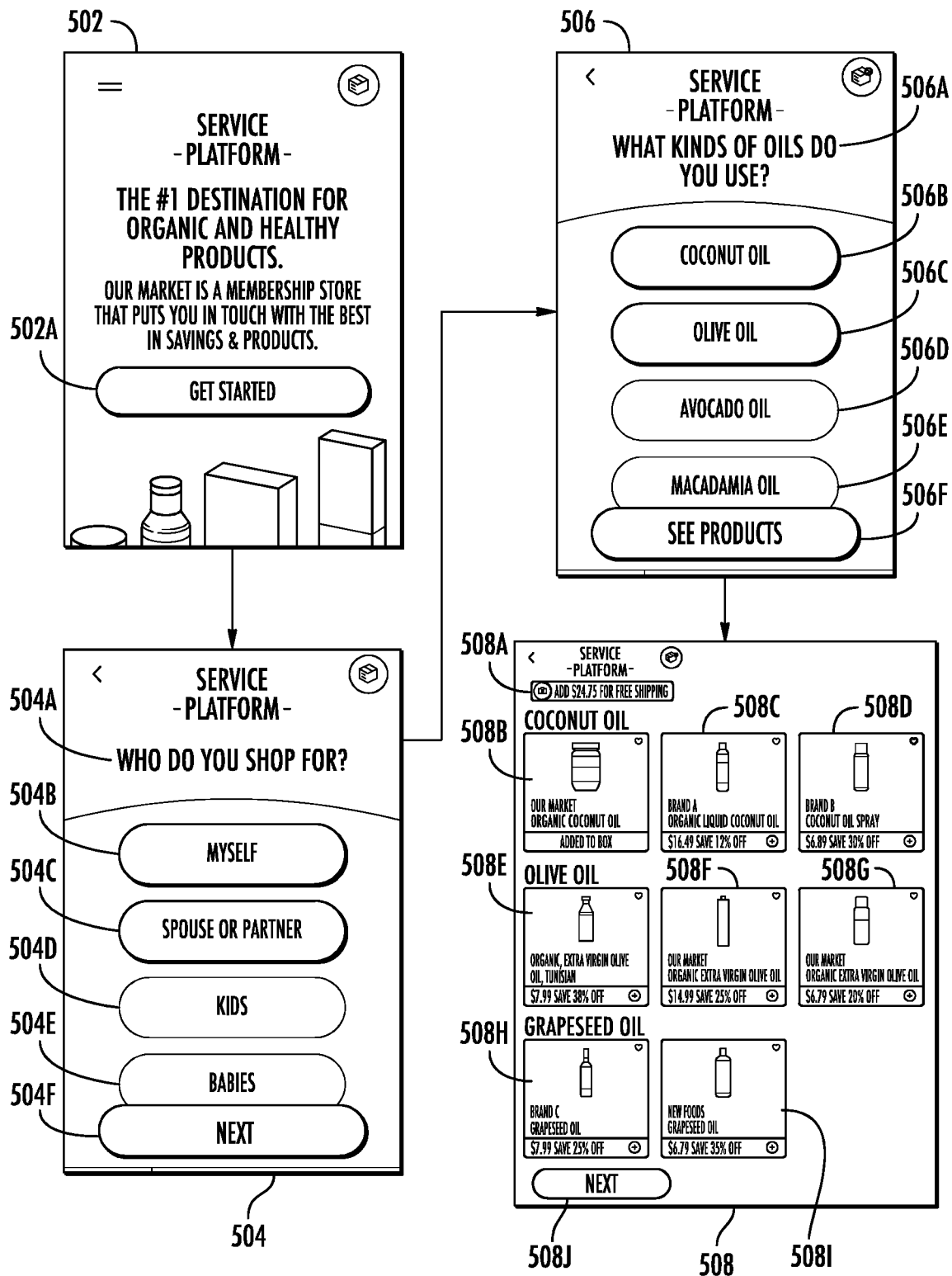
Figure 6A:
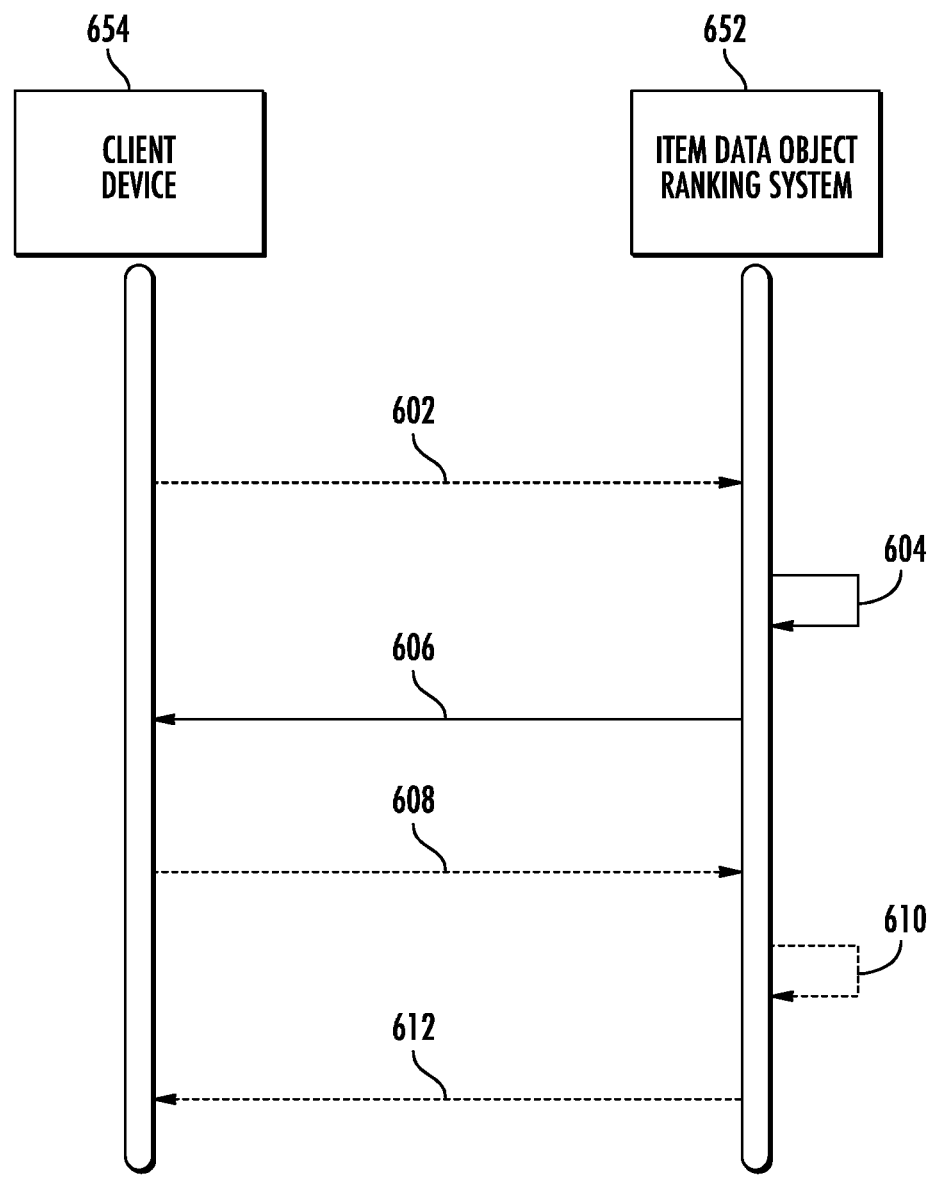
Figure 6B:
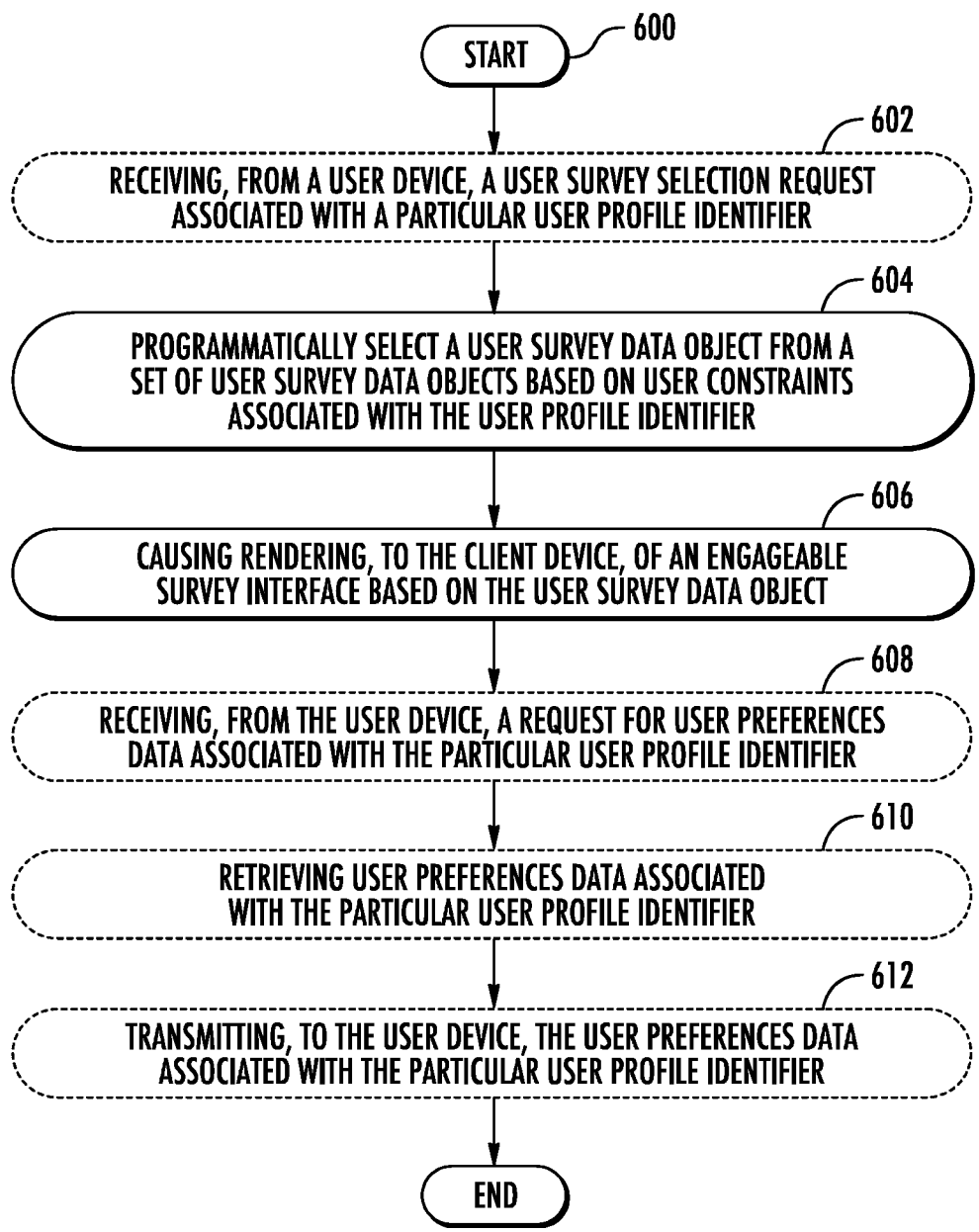
Figure 7A:
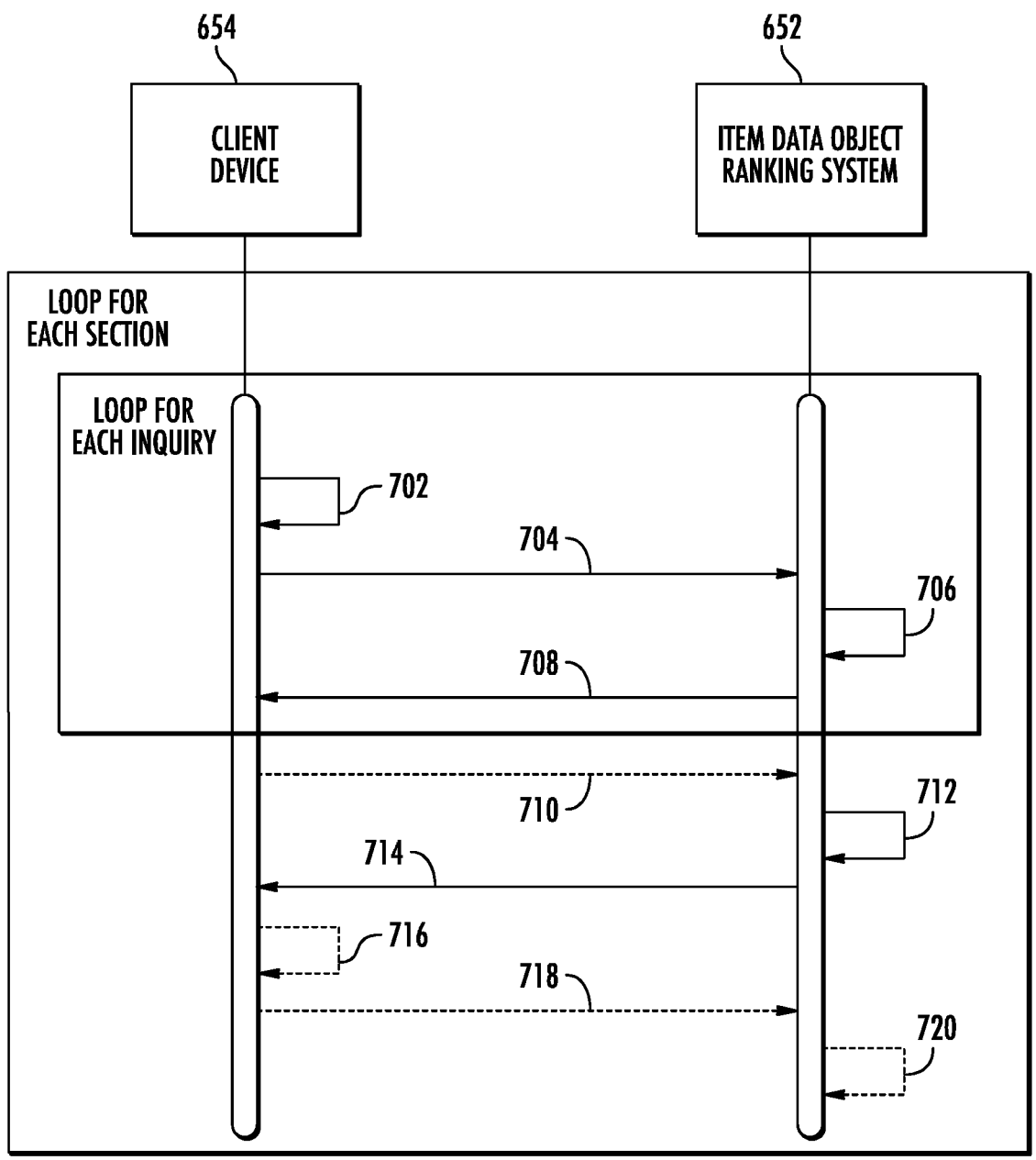
Figure 7B:
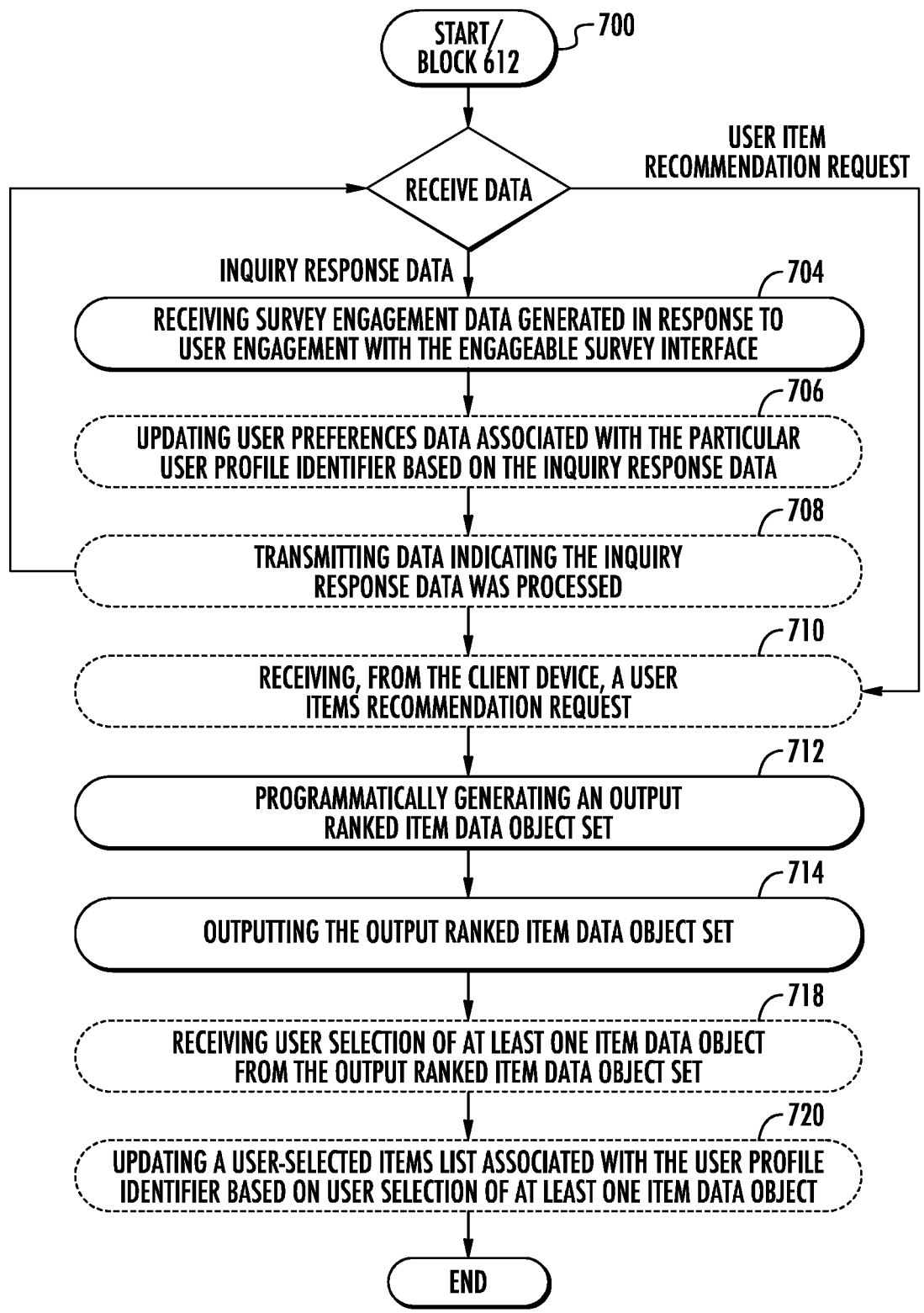
Figure 8:
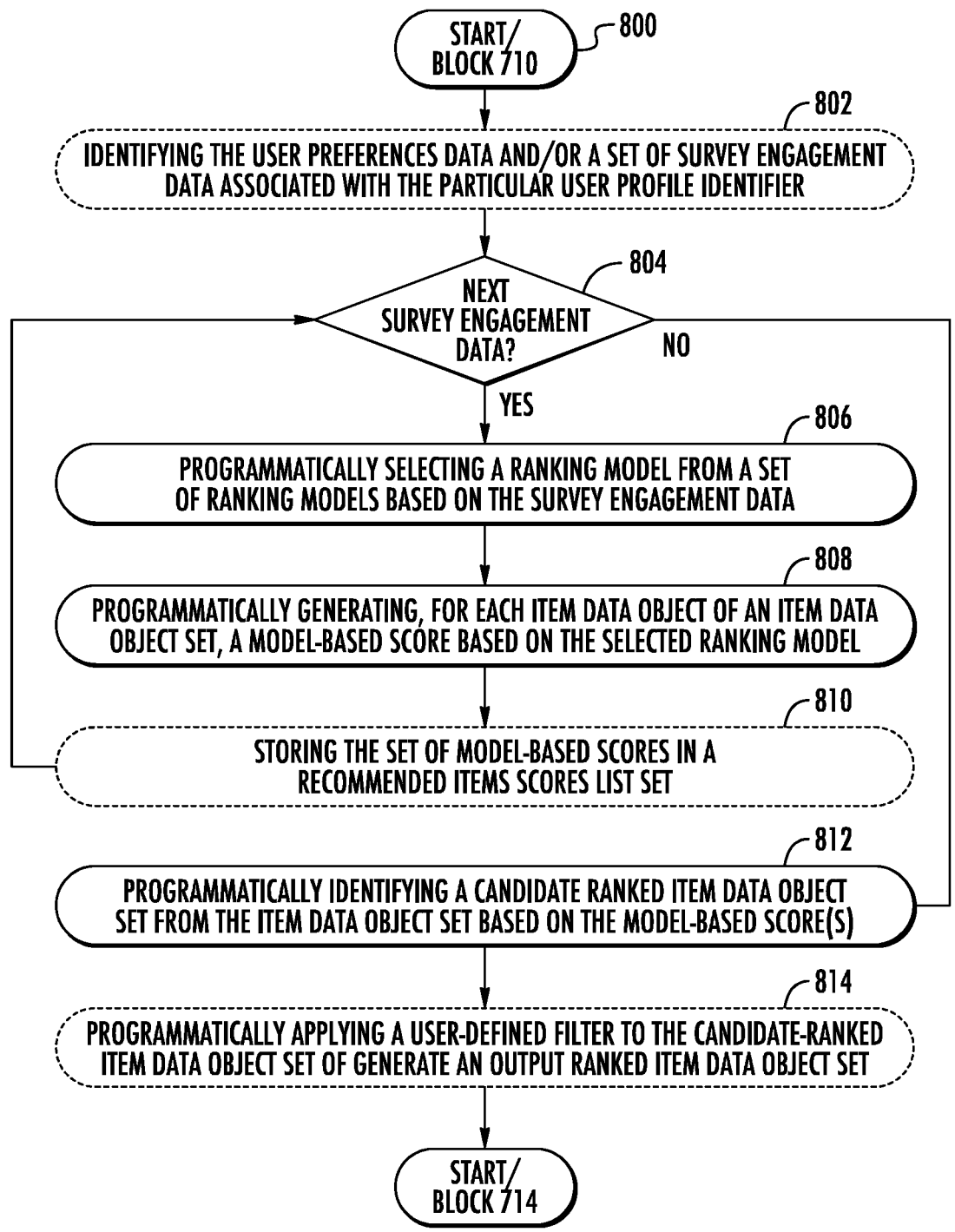
Figure 9:
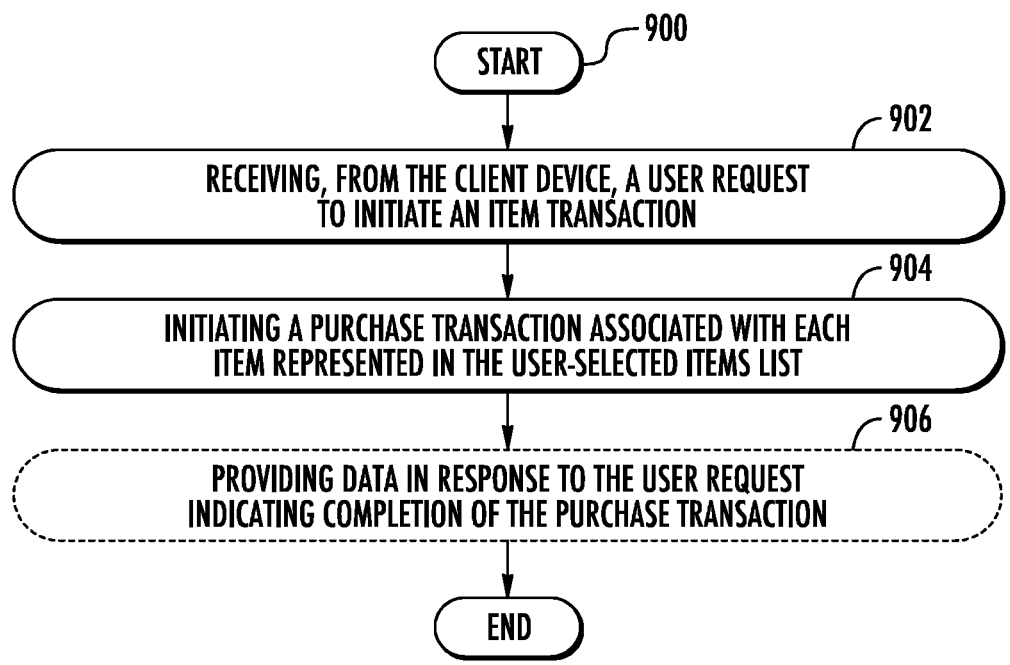

Having thus described the embodiments of the disclosure in general terms, reference now will be made to the accompanying drawings, which are not necessarily drawn to scale, and wherein:

FIG. 1 illustrates a block diagram of a specially configured item data object ranking system structured in accordance with embodiments of the present disclosure;

FIG. 2 illustrates a block diagram of an item data ranking apparatus configured in accordance with an example embodiment of the present disclosure;

FIG. 3 illustrates a visualization of data embodying a user survey data object structured in accordance with at least some example embodiments of the present disclosure;

FIG. 4 illustrates a visualization of data links between inquiry response data objects of an example survey inquiry data object and corresponding ranking models in accordance with at least some example embodiments of the present disclosure;

FIG. 5 illustrates example user interfaces rendered in accordance with at least some example embodiments of the present disclosure;

FIG. 6A illustrates a data flow diagram between a client device and an item data object ranking system embodying a process for customized user survey generation and processing in accordance with at least some example embodiments of the present disclosure;

FIG. 6B illustrates a flowchart including example operations of the process for customized user survey generation and processing as depicted and described with respect to FIG. 6A in accordance with at least some example embodiments of the present disclosure;

FIG. 7A illustrates a data flow diagram between a client device and an item data object ranking system embodying another process, or sub-process, for generating a personalized output ranked item data object set based on a customized user survey as part of customized user survey generation and processing in accordance with at least some example embodiments of the present disclosure;

FIG. 7B illustrates a flowchart including example operations of the process, or sub-process, as depicted and described with respect to FIG. 7A in accordance with at least some example embodiments of the present disclosure;

FIG. 8 illustrates a flowchart including example operations of a process, or sub-process, for generating an output ranked item data object set based on a customized user survey as part of customized user survey generation and processing in accordance with at least some example embodiments of the present disclosure; and FIG. 9 illustrates a flowchart including example operations of a process, or sub-process, for performing a purchase transaction of a user-selected item list as part of customized user survey generation and processing in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Multiple software platforms provide users access to browse, search, and ultimately purchase items made available via the software platform. In the context of item delivery services, for example, users access such software platforms to browse and/or search available items, and purchase items that are particularly of interest to the user. It should be appreciated that such software platforms may provide items in any of a myriad of contexts, including without limitation, clothing, household products, luxury goods, and grocery products and/or consumables.

The inventors have identified that such software platforms benefit from recommending products of interest to a particular user, especially in circumstances where item recommendations are personalized for a particular user. In this regard, by personalizing (or otherwise "customizing") item recommendations for a particular user, the item data objects provided for user consideration may be sufficiently relevant to the particular user based on aspects of the user and their preferences, rather than abstractly recommended for multiple (or all) users. Such personalization leverages particular data signals associated with a particular user. Some example systems fail to sufficiently consider such data signals, and/or fail to process such data signals in a manner that provides effective personalization of such recommendations of item data object(s). The deficiencies of such example systems are exaggerated in circumstances where such processing occurs for a new user of the system, as little to no data associated with the new user may be available.

Embodiments of the present disclosure provide for customized user survey generation and processing for personalized item data object recommending. The embodiments described herein generate a user survey data object for engaging by the user through a software application running on a user or client device. The user survey data object is customized for a particular user, and in some embodiments, is dynamic based on the various engagements by the user. Through engagement with the user survey data object, embodiments of the present disclosure enable obtaining of particular data for processing associated with the particular user for use in providing item data object recommendations to the user.

In some embodiments, the user survey data object is configured to associate each inquiry response data object with a trained recommendations model appropriate and/or best suited for use in generating corresponding recommendations of item data object(s). In this regard, various survey-based item recommendations lists may be generated that may be merged, aggregated, and/or otherwise considered together to improve the accuracy of the relevance represented by an output ranked item data object set provided to the user. In this regard, the customized survey data objects as described herein, and corresponding processing performed by the embodiments described herein, enable providing of recommended item data object(s) that more accurately represent item data objects relevant to a particular user corresponding to a user profile based on the particular configuration of the user survey data object and response data resulting from user engagement with the user survey data object.

Embodiments of the present disclosure provide a myriad of technical improvements in the field of custom survey generation and processing for personalized item recommending. For example, embodiments of the present disclosure improve the accuracy of one or more generated item recommendation list(s) by leveraging multiple ranking model(s) that utilize at least the survey engagement data. In this regard, by improving the overall accuracy of item recommendation list(s), embodiments reduce the amount of computing power that would otherwise be wasted if the user were otherwise required to search and/or browse the item data objects to identify, select, and/or purchase relevant item data object(s).

Additionally or alternatively, by having each inquiry response data objects linked to a particular trained recommendations model, embodiments of the present disclosure improve the accuracy of the generated rankings of item data objects. Additionally or alternatively still, by leveraging a plurality of trained item recommendations models of one or more model types, and associated with any number of inquiry response data object(s), embodiments improve the accuracy of rankings for item data objects in providing an output ranked item data object set for a user profile.

Additionally or alternatively still, by generating a customized survey data object for a particular user profile, embodiments of the present disclosure improve the accuracy of models that utilize the response data, and in some embodiments reduce the computing power required to provide sufficient data for use by a ranking model such as by eliminating the need for a user to interact with one or more particular survey inquiries based on the previous responses and/or other information known about the user. Conventional implementations in this field fail to provide any and all of these technical advantages.

Such technical improvements further yield additional technical advantages in the field of personalized item recommending. For example, embodiments of the present disclosure reduce the amount of computing power (e.g., processing power, memory space, networking data, and/or the like) conventionally wasted by user searching and browsing. In particular, the number of network interactions between a system and a client device, the number of irrelevant interface(s) and/or interface elements rendered, and/or the number of computational search processes conventionally utilized to identify, select, and/or purchase a particular relevant item data object are reduced. Such savings in computing power is further enhanced in circumstances where the multiple item data objects are relevant for a particular user profile.

For example, in some undesirable implementations, multiple queries must be performed and corresponding interfaces rendered to facilitate user browsing and/or searching a significantly large number of item data objects (e.g., thousands or more or of items) in a particular set of items for the user to locate a relevant item. In contrast, embodiments of the present disclosure reduce the amount of computing power utilized to reach the same result. In some embodiments, further computing power is saved by automatically performing one or more actions for determining item data objects identified as relevant (e.g., automatically selecting them for purchase and/or purchasing).

This savings of computing resources improves both execution of the item data object ranking system, which saves computing resources by reducing or eliminating the need to process significant number of queries for item data objects as the user continues to browse of search a database of item data objects for a particular subset of one or more relevant item data object(s), and of the client device, which saves computing resources by reducing or eliminating the need to generate and/or otherwise render user interface changes associated with updating a shown list of item data object(s) and/or reducing or eliminating processing of user input associated with consistently updating a user interface while searching and/or browsing for relevant item data object(s). Conventional implementations in this field fail to provide any and all of these technical advantages.

These technical advantages are provided in addition to a myriad other advantages. For example, embodiments of the present disclosure enable user survey data object generation and processing for new user profiles, such that item data objects may be recommended without any previously-known information associated with the user profile and regardless of whether the user is fully aware of what item data object(s) may be right for recommending to them.

Embodiments of the present disclosure further enable user preferences data to be easily collected and fully processed for item data object recommending. Specifically in one or more e-commerce contexts, embodiments of the present disclosure improve a user's initial ordering experience, such as by enabling user preferences data to be provided quickly and easily via engagement with the user survey data object, and improve the overall relevance of item data object(s) recommended to the user associated with a particular user profile to enable improvement of an overall first transaction conversion rate for new user profile(s) (e.g., increasing the number of new user profiles that initiate at least one transaction by purchasing one or more items).

Additionally or alternatively still, embodiments of the present disclosure reduce the processing time for a user to identify item data object(s) that the user is looking to view, select, and/or obtain (e.g., via a purchase transaction). In this regard, embodiments of the present disclosure not only conserve such processing time, such embodiments reduce the amount of time the user is being provided undesirable and/or otherwise irrelevant item data object(s). Such time saving aspects of embodiments of the present disclosure improve the overall user experience associated with interaction with such embodiments.

As a particular example context, embodiments of the present disclosure may be implemented as an improved e-commerce platform that performs relevant item recommending. User Andy may have newly-registered his user profile with a particular item data object ranking system that facilitates e-commerce transactions for purchasing items made available via the system (e.g., Thrive Market system(s) including or embodied by item data object ranking system). The Thrive Market system benefits significantly from accurately recommending particular items for Andy to purchase, or in other words, identifying particular items or a ranked order of items that are "relevant" to Andy such that he is likely to purchase such items in an instance they are provided to him. Accurately generating a recommendation of particular items from a set of items, however, is both computationally difficult (and/or computationally expensive) and difficult to distill to a usable corpus the wealth of available electronic data that might be available or useful to consider. Such difficulties are exacerbated in the circumstance where Andy is new to the system, as the Thrive Market system, having never interacted with Andy before, does not have any data associated with Andy for use in providing such item data object recommendations.

In this regard, embodiments such as an item data object ranking system embodying or as part of the Thrive Market system, generates a user survey data object associated with the user profile for Andy. The user survey data object may include any number of survey inquiries useful for determining aspects of Andy's lifestyle, shopping habits, eating habits, and/or the like, or user preferences data embodying such aspects or intuitive data derived therefrom. For example, the user survey data object may include any number of survey inquiries utilized to obtain survey engagement data representing products that Andy utilizes in various categories (e.g., what cooking oils, what wines, any food allergies, any food sensitives, and/or the like), how large Andy's family is, who Andy shops for (e.g., just him, him and a significant other, him and a family including kids), and/or the like. Andy may engage with the user survey data object to provide survey engagement data for the various survey inquiries.

In some embodiments, the survey engagement data embodies and/or is utilized to derive particular tags associated with Andy. For example, embodiments may determine from one or more portions of survey engagement data that the user profile associated with Andy should be tagged, for example by including certain user preferences data, that indicates item restrictions and/or other filters to be applied for recommending item data objects to Andy. For example, Andy may be tagged as gluten free in circumstances where survey engagement data indicates such item preferences for Andy. In some such embodiments, item data objects may be tagged with the same tags, such that item data objects relevant to Andy (e.g., that meet at least those preferences and/or requirements) may be identified for scoring and/or providing as recommended item data objects.

The survey engagement data, and/or information derived therefrom, may be utilized to generate an output ranked item data object set that includes a ranked set and/or other defined order of item data objects recommended for selection by Andy. In some embodiments, for example, embodiments maintain one or more ranking models that may generate the item recommendations list for Andy. In some embodiments, a particular ranking model is determinable from a plurality of the ranking models, which may each be embodied by different model types, trained on various different data signals, and/or the like, to improve the overall accuracy of recommended item data objects based on at least the survey engagement data representing Andy's responses to one or more survey inquiries. In this regard, the output ranked item data object set may subsequently be outputted, such that the output ranked item data object set is caused to be rendered for engagement by Andy (e.g., to select item data objects and/or initiate a purchase transaction), automatically selected for Andy, and/or the like. Andy may review the item data object(s) in the item recommendations list to select one or more item data object(s) and/or facilitate a transaction for item data object(s) represented in the output ranked item data object set.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "client device" refers to one or more user-facing computing devices configured to provide access to an external item system via one or more applications executed on the client device. Non-limiting examples of a client device include a user smartphone, tablet, personal computer, laptop, wearable, and/or personal digital assistant.

The term "external item system" refers to one or more computing devices embodied in hardware, software, firmware, and/or a combination thereof, that store an inventory of item data objects available for purchase. In some embodiments, an external item system is controlled by an entity distinct from a second entity controlling an item data object ranking system. For example, an external item system may operate under distinct ownership from a second entity, may operate within a network environment that is distinct from the network environment utilized by the second entity, and may implement network security protocols (e.g., firewalls, separate compiled code repositories, etc.) that further define the distinct nature of such networks.

The term "item data object ranking system" refers to one or more computing devices embodied in hardware, software, firmware, and/or a combination thereof, that processes data associated with a customized user survey data to output an output ranked item data object. In some embodiments, an item data object ranking system is a sub-system of a system enabling browsing and purchase of item data object(s).

The term "user profile" refers to one or more electronically managed data objects associated with a particular user, or associated client device, that access an external item system. In some embodiments, a user profile is associated with user authentication credentials that authenticate a user and/or client device as having access or otherwise being associated with the user profile. The term "user profile identifier" refers to the user profile, or a data value that uniquely represents the user profile.

The term "user survey data object" refers to electronically managed data representing one or more series of survey inquiries regarding any number of preferences for a particular user profile for processing via an item data object ranking system. A user survey data object includes any number of sub-data objects and/or data values.

The term "survey section data object" refers to electronically managed data that includes any number of survey inquiries organized in a defined order. A survey section data object includes one or more recommendation point(s), which initiates generation and/or provision of an output ranked item data object set for use interaction based on response data for survey inquiries in that survey section data object, prior sections, and/or other previously accessed user survey data object(s). In some embodiments, a survey section data object includes a recommendation point at the end of the survey inquires for that survey section data object. The term "survey section data object set" refers to one or more data objects including any number of survey section data objects. In some embodiments, a user survey data object includes a survey section data object set that includes survey section data objects in a defined order.

The term "survey inquiry data object" refers to electronically managed data representing an inquiry regarding a user associated with a user profile that corresponds to one or more user preference(s) for the user profile. A survey inquiry data object is associated with engagement data and/or response data representing any number of possible inquiry response data object(s) representing or associated with values for the one or more user preference(s). The term "survey inquiry data object set" refers to one or more electronically managed data objects including or embodying any number of survey inquiries. In some embodiments, a survey inquiry data object set defines any number of survey inquiries in a defined order.

The term "response data" refers to electronically managed data transmitted from a client device that represents a user-inputted selection of an inquiry response data object associated with a particular survey inquiry data object. The term "set of response data" refers to one or more data objects that include and/or embody any number of response data, each associated with at least one survey inquiry data object.

The term "user survey selection request" refers to electronically managed data that indicates a request to select a user survey data object from a set of user survey data objects based on particular constraints associated with a particular user profile for engagement by a user of a client device linked to or otherwise associated with the user profile. A user survey selection request includes or is associated with data corresponding to a user profile identifier for the user profile that enables selection of a particular user survey data object to be provided associated with the user profile.

The term "engagement survey interface" refers to rendered and/or renderable data that includes data embodied by or otherwise associated with a user survey data object. In some embodiments, an engagement survey interface includes interface element(s) that enable a user to input response data associated with at least one survey inquiry data object of a user survey data object.

The term "recommendations point" refers to one or more data objects, processes, or other electronically managed data that initiates generation and/or causing rendering of an output ranked item data object set based on engagement associated with a user survey data object. In some embodiments, a user survey data object includes data embodying a recommendations point that, when reached, initiates one or more processes for generating and/or causing rendering of an output ranked item data object set based on previous engagement with the user survey data object.

The term "item data object" refers to electronically managed data representing a product, item, or object made available for selection via an item data object ranking system. Non-limiting examples of an item data object includes data representing a grocery item, a consumable, or another consumer good made available for purchase via the item data object ranking system. The term "item data object set" refers to one or more data objects embodying or including any number of item data objects.

The term "candidate ranked item data object" refers to an item data object for which a model-based score has been generated utilizing a corresponding ranking model. The term "candidate ranked item data object set" refers to one or more data objects embodying any number of candidate ranked item data objects. In some embodiments, a candidate ranked item data object set includes a subset of a particular item data object set ranked by a particular ranking model.

The term "response-based item recommendations list" refers to electronically managed data representing zero or more item data object(s) determined as relevant to a particular profile, and/or likely above a particular threshold to be purchased by the user profile, based on response data for a particular survey inquiry data object or group of survey inquiries. A response-based item recommendations list includes an ordered ranking of such item data object(s) based on model-based scores associated with each item data object. A response-based item recommendations list is generated by a ranking model.

The term "response-based item recommendations list set" refers to one or more data objects including or embodying any number of response-based item recommendations list(s). In some embodiments, each response-based item recommendations list includes different item data object(s), includes a different order of item data object(s), and/or is generated by different ranking model(s).

The term "output ranked item data object set" refers to electronically managed data representing zero or more item data object(s) determined as relevant to a particular user profile, and/or likely above a particular threshold to be purchased by the user profile, and to be provided to the user profile. An output ranked item data object set in some embodiments is derived from all response-based item recommendations lists in a response-based item recommendations list set.

The term "ranking model" refers to a statistical, algorithmic, and/or machine learning model specially trained to generate, based on survey engagement data, a response-based item recommendations list comprising a ranking of item data object(s). In some embodiments, a ranking model generates a model-based score for a plurality of item data objects, and generates the response-based item recommendations list based on the model-based scores for the plurality of item data objects. The term "set of ranking models" refers to one or more data objects embodying or including any number of ranking models.

The term "model type" refers to a particular implementation of a ranking model. Non-limiting examples of a model type include random forest of a first density, random forest of a second density, logistic regression, and gradient boosting.

The term "user preferences data" refers to electronically managed data corresponding to a particular user profile that represents values for particular data properties associated with the user profile, preferences of the user represented by the user profile, and specific item data object preferences, that enable prioritization or elimination of item data objects for providing associated with the user profile. In some embodiments, user preferences data embodies data values usable for filtering one or more item data object(s) and/or ranked item data object(s).

The term "unknown user preferences data" refers to electronically managed data corresponding to a particular user profile that represents a particular data property associated with the user profile, preference of the user represented by the user profile, and/or preference for item data objects that does not have an associated value and/or otherwise remains unknown. In some embodiments, unknown user preferences data embodies a key-value pair, where the value of the key-value pair is null or otherwise yet to be filled in based on survey engagement data associated with the user profile. A non-limiting example includes a brand preference data where the user has not yet provided response inquiry data associated with a brand preference.

The term "user-defined filter" refers to electronically managed data or function(s) that define aspects for removing one or more item data objects associated with particular properties from a set including item data objects. In some embodiments, one or more data value(s) of user preferences data defines a user-defined filter for removing one or more item data objects from a candidate ranked item data object set that do not meet the preferences represented by the user preferences data.

The term "item selection engagement interface" refers to rendered and/or renderable data that includes representations of item data object(s) in an output ranked item data object. In some embodiments, an item selection engagement interface includes interface element(s) that represent each item data object, and/or interface element(s) for selecting each of the item data object(s).

The term "user selection of at least one item data object" refers to electronically managed data representing one or more item data object selected by a user from an output ranked item data object. In some embodiments, a user selection of at least one item data object is generated and/or received in response to user input with an item selection engagement interface.

The term "user-selected set of item data objects" refers to electronically managed data representing any number of item data object(s) for which a user selection was received. In some embodiments, the user-selected set of item data objects is associated with a particular user profile.

The term "user request for item purchasing" refers to electronically managed data received by an item recommendations system from a client device indicating a user request to purchase the items represented by item data objects in a user-selected set of item data objects associated with the user profile.

The term "purchase transaction" refers to one or more processes initiated by an item recommendations system to effectuate purchase of the items represented by item data objects in a user selected item list associated with a particular user profile. In some embodiments, a purchase transaction includes debiting a user account associated with a particular user profile, and initiating distribution of items.

Example Systems of the Disclosure

FIG. 1 illustrates a block diagram of a specially configured example custom surveying system within which embodiments of the present disclosure may operate. Specifically, FIG. 1 depicts an example custom surveying system 100 including a client device 106, an item data object ranking system 102, and an external item system 104. The item data object ranking system 102 is configured to communicate with the client device 106 and the external item system 104 over the communications network 108.

In some embodiments, the client device 106 embodies one or more computing device(s) specially configured to enable user-facing functionality as described herein. For example, in some embodiments, the client device 106 is embodied in hardware, software, firmware, and/or any combination thereof that provides access to a user-facing application enabling access to the item data object ranking system 102. In some embodiments, for example, the client device 106 embodies a mobile computing device configured to execute a native user-facing application and/or access a web application on the client device. In this regard, a user of the client device 106 may access the user-facing application(s) executed on the client device 106 to initiate operations associated with the item data object ranking system 102 (e.g., by transmitting specially configured requests, receiving response data, and/or processing such response data. For example, the user of the client device 106 may utilize the client device to initiate an authenticated session with a particular user profile, receive and process a customized survey data object, cause rendering of information associated therewith and/or determined associated recommended item data objects, and/or managing item data object selection(s) by the user of the client device to facilitate a transaction of such item data object(s). In this regard, in some embodiments, the client device 106 includes one or more adaptive-displays, input/output devices, wireless network communication interfaces, and/or the like. The client device 106, in some such embodiments, serves as the point of interaction with a particular user of the item data object ranking system 102, for example a new online shopper accessing the item data object ranking system 102 for purposes of item recommendation and transacting.

The item data object ranking system 102 is embodied by one or more computing devices configured to provide user survey data object generation and/or processing functionality as described herein. For example, in some embodiments, the item data object ranking system 102 is configured for performing such functionality for personalized item data object recommending to one or more users, for example to the user of the client device 106. In this regard, the item data object ranking system 102 may generate and serve a user survey data object to the client device 106 for engagement by the user of the client device 106, and process data associated with the engagement by the user (e.g., response inquiry data as described herein) to provide one or more item recommendations lists to the client device 106, and/or process transactions associated with selections of item data object(s) such item recommendation lists.

As illustrated, in at least some embodiments, the item data object ranking system 102 includes a specially configured survey-based recommendation server 102A and a specially configured survey-based recommendation repository 102B. The survey-based recommendation server 102A includes one or more specially configured servers embodied in hardware, software, firmware, and/or any combination thereof, that provide user survey data object generation and/or processing functionality. In some embodiments, for example, the survey-based recommendation server 102A includes one or more server(s) that receive information embodying a user survey selection request (e.g., associated with a particular user profile identifier unique to the client device 106 and/or associated with an authenticated session initiated via the client device 106), generate a user survey data object, and causing rendering of an engageable survey interface based on the user survey data object to the client device 106.

Additionally or alternatively, in some embodiments, the survey-based recommendation server 102A includes one or more server(s) that receive a set of survey engagement data associated with the user survey data object, receive a user items recommendation request, generate an output ranked item data object, and output the output ranked item data object set to the client device. In some such embodiments, the output ranked item data object set is generated based on the set of inquiry response data objects. Additionally or alternatively still, in some embodiments, the survey-based recommendation server 102A includes one or more server(s) that receive data indicating user selection of at least one item data object from the output ranked item data object, update a user-selected set of item data objects associated with the particular user profile, and facilitate initiation of a purchase transaction of a user-selected set of item data objects.

It should be appreciated that the survey-based recommendation server 102A may include or otherwise embody any number of servers, including one or more virtual, remote, and/or "cloud" servers. For example, in some embodiments, the survey-based recommendation server 102A embodies computing hardware configured to embody any number of virtual server(s) that each perform various portions of the functionality as described. Alternatively or additionally, in some embodiments, the survey-based recommendation server 102A includes any number of communicable but separate physical servers, for example a plurality of cloud servers located in a remote cloud environment.

To perform some or all of the described functionality, the survey-based recommendation server 102A may interact with the survey-based recommendation repository 102B. The survey-based recommendation repository 102B may include any number of memory storage device(s) and/or computing systems embodied in hardware, software, firmware, and/or a combination thereof, configured to persistently store data for processing by the survey-based recommendation server 102A. In this regard, the survey-based recommendation server 102A may store various information to the survey-based recommendation repository 102B during processing, and/or retrieve information from the survey-based recommendation repository 102B for performing the described functionality. For example, non-limiting examples of data stored to the survey-based recommendation repository 102B by the survey-based recommendation server 102A include user profile(s) and/or associated user authentication credentials, user preferences data associated with particular user profile(s), data associated with user survey data object(s) (e.g., survey inquiries and associated inquiry response data objects for each survey inquiry data object, survey section data object(s) including certain survey inquiries and/or recommendation point(s), and/or the like), available item data object(s), and/or user-selected item list(s).

Additionally or alternatively, in some embodiments, the survey-based recommendation repository 102B is configured to store a set of user survey data object for selecting associated with a particular user profile. Additionally or alternatively, in some embodiments, the survey-based recommendation repository 102B is configured to store ranking model(s) of various model type(s) and/or associations between such ranking model(s) and particular inquiry response data object(s) of one or more user survey data object(s) maintained by the item data object ranking system 102.

In some embodiments, the survey-based recommendation repository 102B includes one or more computing devices that enable requesting and/or retrieval of the data stored by the survey-based recommendation repository 102B. For example, the survey-based recommendation repository 102B may include one or more databases and corresponding software, hardware, and/or firmware that manages storage of data to, and/or retrieval of data from, the one or more databases.

It should be appreciated that the survey-based recommendation repository 102B may include or otherwise embody any number of repositories, including one or more virtual, remote, and/or "cloud" repositories. For example, in some embodiments, the survey-based recommendation repository 102B embodies computing hardware configured to embody any number of virtual repository/repositories that each store various portions of the described data. Alternatively or additionally, in some embodiments, the survey-based recommendation repository 102B includes any number of communicable but separate physical repositories, for example a plurality of cloud repositories located in a remote cloud environment.

The item data object ranking system 102 provides access to particular item data object(s) made available via the item data object ranking system 102. In some such embodiments, the item data object ranking system 102 maintains a set of item data object(s) independently, for example where the item data object ranking system 102 embodies or otherwise is associated with a warehousing system associated with stored items represented by the item data object(s). Additionally or alternatively, in some embodiments, the item data object ranking system 102 provides access to particular item data object(s) fulfilled through one or more third-party and/or external providers. For example, in some embodiments, the item data object ranking system 102 communicates with external item system 104 to identify available item data object(s) for providing to and/or recommending to one or more user(s), for example via client devices including the client device 106. In this regard, the item data object ranking system 102 may communicate with the external item system 104 to determine available item data object(s) for use in generating item recommendation lists and/or outputting to a user during browsing and/or searching of such item data object(s). In some such embodiments, the item data object ranking system 102 requests and receives data embodying available item data object(s) from the external item system 104. The survey-based recommendation server 102A is configured to enable communication with the external item system 104 and processing of data received therefrom.

Example Apparatuses of the Disclosure

Having discussed example systems structured in accordance with the present disclosure, example apparatuses configured in accordance with the present disclosure will now be described. In some embodiments, an item data object ranking system 102 is embodied by one or more computing systems, such as the survey-based recommendation apparatus 200 as depicted and described in FIG. 2. The survey-based recommendation apparatus 200 includes processor 202, memory 204, input/output circuitry 206, communications circuitry 208, survey creation circuitry 210, and/or survey processing circuitry 212. The survey-based recommendation apparatus 200 may be configured, using one or more of the sets of circuitry 202, 204, 206, 208, 210, and/or 212, to execute the operations described herein.

Although components are described with respect to functional limitations, it should be understood that the particular implementations necessarily include the use of particular computing hardware. It should also be understood that certain of the components described herein may include similar or common hardware. Two sets of circuitry, for example, may both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the survey-based recommendation apparatus 200 may provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) may be in communication with the memory 204 via a bus for passing information among components of the survey-based recommendation apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the survey-based recommendation apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the survey-based recommendation apparatus 200, and/or one or more remote or "cloud" processor(s) external to the survey-based recommendation apparatus 200.

In an example embodiment, the processor 202 may be configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions may specifically configure the processor 202 to perform the algorithms embodied by the specific operations described herein when the instructions are executed.

As one particular example, the processor 202 may be configured to perform various operations associated with facilitating custom survey data object generation and/or processing. In some embodiments, the processor 202 includes hardware, software, firmware, and/or a combination thereof, that receives a user survey selection request, which in some embodiments is associated with a user profile identifier. Additionally or alternatively, in some embodiments, the processor 202 includes hardware, software, firmware, and/or a combination thereof, that generates a user survey data object associated with a user profile identifier, for example associated with the particular user profile identifier associated with or included in the user survey selection request. Additionally or alternatively still, in some embodiments, the processor 202 includes hardware, software, firmware, and/or a combination thereof, that causes rendering of an engageable survey interface based on the user survey data object.

Additionally or alternatively, in some embodiments, the processor 202 includes hardware, software, firmware, and/or a combination thereof, that receives and processes data associated with the generated user survey data object. In some embodiments, the processor 202 includes hardware, software, firmware, and/or a combination thereof, that receives survey engagement data from a survey inquiry data object of the user survey data object. Additionally or alternatively, in some embodiments, the processor 202 includes hardware, software, firmware, and/or a combination thereof, that updates user preferences data associated with a user profile identifier based on the survey engagement data. Additionally or alternatively, in some embodiments, the processor 202 includes hardware, software, firmware, and/or a combination thereof, that generates and/or outputs an output ranked item data object set for a user profile identifier. Additionally or alternatively still, in some embodiments, the processor 202 includes hardware, software, firmware, and/or a combination thereof, that maintains a user-selected item list associated with a user profile identifier, and/or initiates transaction(s) associated with a user-selected set of item data objects.

In some embodiments, the survey-based recommendation apparatus 200 includes input/output circuitry 206. In some such embodiments, the input/output circuitry 206, in turn, is in communication with processor 202 to provide output to the user and, in some embodiments, to receive an indication of a user input. The input/output circuitry 206 may comprise one or more user interface(s) and may include a display that may comprise the interface(s) rendered as a web user interface, an application interface, a user device, a backend system, or the like. In some embodiments, the input/output circuitry 206 may also include a keyboard, a mouse, a joystick, a touch screen, touch areas, soft keys, a microphone, a speaker, and/or other input/output mechanisms. The processor 202, and/or input/output circuitry 206 comprising the processor 202, may be configured to control one or more functions of one or more user interface elements through computer program instructions (e.g., software and/or firmware) stored on a memory accessible to the processor 202 (e.g., memory 204, and/or the like).

The communications circuitry 208 includes any means, such as a device or circuitry embodied in either hardware or a combination of hardware and software, that is configured to receive and/or transmit data from/to a network and/or any other device, circuitry, or module in communication with the survey-based recommendation apparatus 200. In this regard, the communications circuitry 208 may include, for example, a network interface for enabling communications with a wired or wireless communication network. For example, the communications circuitry 208 may include one or more network interface card(s), antenna(s), bus(es), switch(es), router(s), modem(s), and supporting hardware and/or software, or any other device suitable for enabling communications via one or more communication network(s). Additionally or alternatively, the communications circuitry 208 may include circuitry for interacting with the antenna(s) and/or other hardware or software to cause transmission of signals via the antenna(s) or to handle receipt of signals received via the antenna(s).

The survey-based recommendation apparatus 200 includes survey creation circuitry 210. The survey creation circuitry 210 includes hardware, software, firmware, and/or a combination thereof, configured to support functionality associated with customized user survey generation. In some embodiments, the survey creation circuitry 210 includes hardware, software, firmware, and/or a combination thereof, that manages storage of user preferences data associated with any number of user profiles. Additionally or alternatively, in some embodiments, the survey creation circuitry 210 includes hardware, software, firmware, and/or a combination thereof, that maintains any number of survey inquiries and/or corresponding inquiry response data objects, and/or structured data objects representing user survey data object(s). Additionally or alternatively, in some embodiments, the survey creation circuitry 210 includes hardware, software, firmware, and/or a combination thereof, that receives a user survey selection request, generates a user survey data object, and/or causes rendering of an engageable survey interface based on the user survey data object. It should be appreciated that, in some embodiments, the survey creation circuitry 210 includes a separate processor, specially configured field programmable gate array (FPGA), or a specially programmed application specific integrated circuit (ASIC).

The survey-based recommendation apparatus 200 includes survey processing circuitry 212. The survey processing circuitry 212 includes hardware, software, firmware, and/or a combination thereof, configured to support functionality associated with customized user survey processing for item recommendation. In some embodiments, the survey processing circuitry 212 utilizes processing circuitry, such as the processor 202, to perform one or more of such actions. For example, in some embodiments, the survey processing circuitry 212 includes hardware, software, firmware, and/or a combination thereof, that receives survey engagement data associated with one or more survey inquiry data object/inquiries of a user survey data object. Additionally or alternatively, in some embodiments, the survey processing circuitry 212 includes hardware, software, firmware, and/or a combination thereof, that processes survey engagement data to update user preferences data based on survey engagement data. Additionally or alternatively, in some embodiments, the survey processing circuitry 212 includes hardware, software, firmware, and/or a combination thereof, that identifies a ranking model based on received survey engagement data, generates an item recommendations list based on the ranking model, and stores the item recommendations list in a response-based item recommendations list set and/or processes the item recommendations list or item recommendations list set.

Additionally or alternatively, in some embodiments, the survey processing circuitry 212 includes hardware, software, firmware, and/or a combination thereof, that generates an output ranked item data object, for example based on a response-based recommendations list set. Additionally or alternatively, in some embodiments, the survey processing circuitry 212 includes hardware, software, firmware, and/or a combination thereof, that alters the output ranked item data object set based on user preferences data associated with a particular user profile identifier.

Additionally or alternatively still, in some embodiments, the survey processing circuitry 212 includes hardware, software, firmware, and/or a combination thereof, configured to support functionality associated with item purchase transaction initiations. In some embodiments, the survey processing circuitry 212 includes hardware, software, firmware, and/or a combination thereof, that maintains one or more user-selected item list. Additionally or alternatively, in some embodiments, the survey processing circuitry 212 includes hardware, software, firmware, and/or a combination thereof, that receives user selection by a user profile identifier of at least one item data object from one or more output ranked item data object, and updating a user-selected set of item data objects associated with the user profile identifier based on the selection. Additionally or alternatively, in some embodiments, the survey processing circuitry 212 includes hardware, software, firmware, and/or a combination thereof, that receives a user request for item purchasing, and initiates a purchase transaction associated with each item represented in the user-selected set of item data objects. It should be appreciated that, in some embodiments, survey processing circuitry 212 may include a separate processor, specially configured field programmable gate array (FPGA), or a specially programmed application specific integrated circuit (ASIC).

It should be appreciated that, in some embodiments, one or more of the sets of circuitry 202-212 are combinable. Alternatively or additionally, in some embodiments, one or more of the modules performs some or all of the functionality described associated with another component. For example, in some embodiments, the survey creation circuitry 210 and survey processing circuitry 212 are combined into a single set of circuitry that performs the actions of both. Similarly, in some embodiments, one or more of the survey creation circuitry 210 and/or survey processing circuitry 212 is combined with or embodied by the processor 202, such that the processor 202 performs one or more of the operations described above with respect to each of the survey creation circuitry 210 and/or survey processing circuitry 212.

Example Data Objects of the Disclosure

Having discussed example systems and apparatuses in accordance with the present disclosure, example data objects, properties and/or structures of such data objects, and associations between various data objects in accordance with the present disclosure will now be described. Each of the visualized data objects and/or associations between data objects may be created and/or maintained by one or more of the described computing devices, systems, and/or apparatuses. For example, in some embodiments, one or more of the data depicted and described is generated and/or maintained by the survey-based recommendation apparatus 200. Additionally or alternatively, in some embodiments, one or more of the data objects depicted and described is transmitted to a client device to be maintained by the client device for engagement by a user of the client device, and/or generation and/or transmission of data in response to the engagement. FIG. 3 illustrates a visualization of data embodying a user survey data object 300 in accordance with at least some example embodiments of the present disclosure. The user survey data object 300 organizes data configured to be engaged by a corresponding user. Specifically, the user survey data object 300 organizes a set of user inquiries that, at each of which, a user is to engage with to provide survey engagement data and a set of recommendation points that, at each of which, the user is to engage with to receive recommended item data object(s) and/or select one or more of such recommended item data object(s). In this regard, the user survey data object 300 may define various points at which the user may provide user input. For example, in some embodiments, survey-based recommendation apparatus 200 causes rendering of an engageable survey interface that enables the user to provide engagement associated with each of the components of the user survey data object 300, such as the survey inquiries and the recommendations point(s) therein.

As depicted, the user survey data object 300 includes a plurality of survey section data objects, specifically a first survey section data object 302A and an optional second survey section data object 302B (collectively "survey section data objects 302"). Each survey section data object defines a number of survey inquiries and/or recommendation points. In this regard, the user may interact with the custom data object to view various survey inquiries embodied thereby and provide survey engagement data for each survey inquiry data object. Additionally or alternatively, the user may interact with the custom data object to view, at each recommendations point, one or more recommended item data object(s) and/or select one or more of such item data object(s).

The survey section data objects 302 are arranged in a defined order of survey section data objects. In this regard, information embodied in the first survey section data object 302A is presented first for engagement by a user. In some such embodiments, all information embodied in the first survey section data object 302A must be completed before presenting information embodied by the second survey section data object 302B. For example, once a final portion of the first survey section data object 302A is completed (e.g., the user has finished responding to each survey inquiry data object and engaging at recommendations point 310, as described herein), information embodied in the survey section data object 302B may subsequently be presented for engagement by the user. In some embodiments, each survey section data object includes at least one survey inquiry data object and at least one recommendations point at the end of the survey section data object, wherein at the recommendations point a recommended item list is provided based on at least the survey engagement data associated with the survey inquiries in the survey section data object.

In this regard, survey section data object 302A includes a plurality of survey inquiries, namely survey inquiry data object 304, survey inquiry data object 306, and survey inquiry data object 308 (collectively, "survey inquiry data objects 304, 306, and 308"). Each of the survey inquiry data objects 304, 306, and 308 may include or otherwise embody an informational request associated with the user. In some embodiments, each survey inquiry data object is selected based on the particular user profile identifier corresponding to a user profile for the user. For example, in some embodiments, each of the survey inquiries is determined based on particular user preferences data associated with the user profile identifier.

Each of the survey inquiries is associated with any number of inquiry response data objects. Each inquiry response data object may embody and/or otherwise be associated with a different value for a particular user preference. In some embodiments, each survey inquiry data object is associated with a predetermined set of inquiry response data objects representing possible user preferences data associated with the corresponding survey inquiry data object. Each survey inquiry data object may be associated with any number of inquiry response data objects. For example, the survey inquiry data object 304 is associated with an inquiry response data object set including inquiry response data objects 304A, 304B, 304C, and 304D. Survey inquiry data object 306 is associated with an inquiry response data object set including inquiry response data objects 306A and 306B. Survey inquiry data object 308 is associated with an inquiry response data object set including inquiry response data objects 308A, 308B, and 308C. In this regard, the user may engage a particular inquiry response data object that represents the user's preference to be embodied in one or more user preferences associated with the user profile corresponding to the user.

The survey inquiries of the survey section data object 302A are further associated with a defined order. The defined order may be entirely sequentially, or dependent on an inquiry response data object engaged by a user. For example, as illustrated, the survey inquiry data object 304 is depicted as the first survey inquiry data object to be presented to the user. The subsequent survey inquiry data object presented to the user may be survey inquiry data object 306 or survey inquiry data object 308, dependent on the inquiry response data object to the survey inquiry data object 304. For example, in some embodiments, the survey inquiry data object 306 may be presented in a circumstance where inquiry response data object 304A or 304C is engaged as the survey engagement data for survey inquiry data object 304, and the survey inquiry data object 308 may be presented in a circumstance where inquiry response data object 304B or 304D is engaged as the survey engagement data for survey inquiry data object 304. Other survey inquiries, such as the survey inquiry data object 306, proceed to only one subsequent survey inquiry data object regardless of the survey engagement data engaged by the user for the corresponding survey inquiry data object. In this regard, the flow of the survey inquiries in the survey section data object 302A proceeds until a recommendations point is reached, for example recommendations point 310.

At recommendations point 310, a recommendations item list is provided for user review and/or engagement. In this regard, one or more user interface(s) are provided that enables a user to view the recommended item data object(s) and/or select one or more of such item data object(s). The user may select such item data object(s) to update a user-selected set of item data objects associated with the user profile identifier for the user. For example, the user may select item data objects representing items the user is interested in purchasing via a purchase transaction. The recommendations item list may include any number of item data object(s) determined to likely be relevant to the user based on the survey engagement data for the survey inquiries in the corresponding survey section data object, a sub-portion thereof, in previous survey section data objects of the user survey data object 300, and/or from previously completed user survey data object(s), and/or corresponding preferences data associated with such survey engagement data.

The user survey data object 300 is further associated with a defined order of survey section data objects. Specifically, as illustrated, the survey section data object 302A is presented first, followed by the survey section data object 302B. It should be appreciated that the survey section data object 302B may include any number of survey inquiries and recommendations points distinct from the particular organization and/or components of the survey section data object 302A. In this regard, for example, the survey section data objects 302 may each include survey inquiries associated with different topics, different portions of user preferences data, and/or the like. In other embodiments, the user survey data object may include a single survey section data object (e.g., only the survey section data object 302A), and/or may include any number of additional survey section data objects not depicted.

Each of the survey section data objects 302A and 302B may include any number of distinct survey inquiries and/or recommendations points, each organized into any particular defined order such that the flow between the survey inquiries and/or recommendations points is well-defined. Further, a user survey data object may include any number of survey section data objects organized into any particular defined order. Additionally or alternatively, In this regard, it should be appreciated that the user survey data object may be organized and/or arranged into any of a myriad of custom arrangements.

In some embodiments, for example, each survey section data object is associated with different categories of item data objects. In this regard, survey section data object 302A, for example, may include survey inquiries associated with determining survey engagement data embodying and/or associated with user preferences data for oil item data objects, and survey section data object 302B may include survey inquiries associated with determining survey engagement data embodying and/or associated with user preferences data for snack item data objects. In this regard, in some such embodiments, the survey engagement data for each particular survey section data object may be utilized to generate item recommendations lists particularly for items matching the same item category. For example, the survey engagement data for each survey inquiry data object in survey section data object 302A associated with oil item data objects may be utilized to generate an item recommendations list of available oil item data objects to be presented at the recommendations point of survey section data object 302A, and the survey engagement data for each survey inquiry data object in survey section data object 302B associated with snack item data objects may be utilized to generate an item recommendations list of available snack item data objects to be presented at the recommendations point of survey section data object 302B. It should be appreciated that the particular item categories are exemplary, and survey section data object(s) and/or particular survey inquiries may be associated with any of a number of item categories.

In some embodiments, each user survey data object is embodied by or otherwise associated with a survey configuration data file. The survey configuration data file may indicate the existence and/or organization of particular data objects that embody the corresponding user survey data object. For example, the survey configuration data file maps each survey inquiry data object with a particular survey section data object, maps each inquiry response data object to a particular survey inquiry data object, maps the organization of survey inquiry data object(s) and/or recommendation point(s) within a particular survey section data object, and/or the like. The survey-based recommendation apparatus 200 may maintain such user survey data objects in one or more repositories for retrieval when providing the corresponding user survey data object.

In some embodiments, one or more aspects of the user survey data object is programmatically generated and/or altered. For example, in some embodiments, the arrangement of survey section data object(s) and/or survey inquiry data object(s) within one or more sections may be programmatically generated or programmatically altered. Alternatively or additionally still, in some embodiments, the flow of survey inquiry data object(s) and/or survey section data object(s) may be programmatically altered and/or programmatically generated. For example, in some embodiments, the flow of survey inquiries is programmatically generated and/or programmatically altered to skip one or more survey inquiry data object(s).

Such aspects may be programmatically generated and/or altered based on one or more aspects associated with a user profile. For example, in some embodiments, the user survey data object is programmatically generated and/or programmatically altered based on attributes associated with a user profile (e.g., who a user is, biographical information, and/or the like). Additionally or alternatively, in some embodiments, the user survey data object is programmatically generated and/or programmatically altered based on inquiry response data for one or more survey inquiry data object(s) with which the user has already interacted (e.g., to provide an answer to the survey inquiry). In some embodiments, such programmatic adjustments may be performed by programmatically generating or altering a survey configuration data object associated with a user survey data object.

FIG. 4 illustrates a visualization of data links between inquiry response data objects of an example survey inquiry data object and corresponding ranking models in accordance with at least some example embodiments of the present disclosure. Specifically, FIG. 4 depicts a visualization of data links between inquiry response data objects for survey inquiry data object 304, specifically inquiry response data objects 304A-304D, and a corresponding ranking model for each inquiry response data object. In this regard, when survey-based recommendation apparatus 200 receives particular survey engagement data corresponding to a particular inquiry response data object, a ranking model corresponding to the survey engagement data is identifiable based on the data link between the inquiry response data object represented by the survey engagement data and the corresponding ranking model. As illustrated, the inquiry response data object 304A is linked to a ranking model 402A, the inquiry response data object 304B is linked with a ranking model 402B, the inquiry response data object 304C is linked to a ranking model 402C, and the inquiry response data object 304D is linked to a ranking model 402D.

In this regard, each data link may be embodied by data that associates survey engagement data with a particular ranking model and/or particular type of ranking model. For example, in some embodiments, survey-based recommendation apparatus 200 maintains a dictionary and/or set that maps survey engagement data representing each of the inquiry response data objects 304A-304D to a data object or identifier representing the corresponding ranking model of the ranking models 402A-40D. In some embodiments, the data links between survey engagement data and a ranking model is predetermined and/or static (e.g., the survey engagement data representing inquiry response data object 304A is always associated with ranking model 402A). In other embodiments, survey-based recommendation apparatus 200 determines the data links between particular survey engagement data and a ranking model, for example in real-time based on a set of ranking models for use, user preferences data for the user profile, and/or the like.

Survey engagement data representing each inquiry response data object may be linked to a ranking model determined to most accurately produce an item recommendations list. In this regard, each candidate trained recommendation ranking model may be associated with model accuracy data associated with survey engagement data representing a particular inquiry response data object. For example, the model accuracy data in some embodiments embodies an area under curve value for each candidate trained recommendations model, where the area under curve value represents an accuracy determined for the candidate trained recommendations model based on the inquiry response data object from one or more test phases of the candidate trained recommendations model. It should be appreciated that other known metrics for ranking algorithmic, statistical, and/or machine learning models may be utilized in other embodiments. In some such embodiments, survey-based recommendation apparatus 200 may determine the most accurate (or otherwise, "best") candidate ranking model for generating an item recommendations list, and link the inquiry response data object to the most accurate or otherwise best candidate ranking model for use. Survey-based recommendation apparatus 200 may continue this process for each inquiry response data object, such that the survey engagement data representing each inquiry response data object corresponds to a particular trained recommendations rankings model that generates a most accurate item recommendations list based on the survey engagement data.

In some embodiments, survey-based recommendation apparatus 200 identifies a most accurate or otherwise best ranking model for particular survey engagement data. For example, in some embodiments, for particular survey engagement data representing a particular inquiry response data object, survey-based recommendation apparatus 200 generates a model ranking metric value for a plurality of ranking models of different model types. In one particular example, survey-based recommendation apparatus 200 generates, based on a set of testing data and/or a set of training data, a first model ranking metric value for a logistic regression ranking model, a second model ranking metric value for a random forest ranking model, and/or a third model ranking metric value for a gradient boosting ranking model. Survey-based recommendation apparatus 200 may subsequently determine the most accurate ranking model based on the various model ranking metric values (e.g., which value is highest), and utilize the most accurate ranking model as the ranking model for the particular survey engagement data. Survey-based recommendation apparatus 200 may subsequently repeat this procedure for the next survey engagement data representing the next inquiry response data object to associate the next survey engagement data with the most accurate ranking model for that inquiry response data object. In this regard, the ranking model for each inquiry response data object may be the same for one or more inquiry response data object, and/or different for each inquiry response data object. In other embodiments, survey-based recommendation apparatus 200 receives the various model ranking metric values for a plurality of ranking models, for example from an external system and/or third-party system that generates the model ranking metric values in the manner described above. Additionally or alternatively, in some such embodiments, the survey-based recommendation apparatus 200 processes the received model ranking metric values to establish data links between the inquiry response data objects and a corresponding ranking model.

In some embodiments, each inquiry response data object is associated with a particular ranking model built by leveraging historical data comprising inquiry response data object(s) for one or more survey inquiry data object(s), corresponding ranked item data object(s) provided to such user(s), and/or item data object(s) for which purchase transaction(s) were initiated by such users. In some such embodiments, the ranking model is built to best improve discoverability and/or likelihood of a purchase transaction occurring with respect to ranked item data objects that the ranking model ranks higher.

Example Interfaces of the Disclosure

Having discussed example systems and apparatuses in accordance with the present disclosure, example data objects, properties and/or structures of such data objects, and associations between various data objects, example user interfaces in accordance with at least some example embodiments of the present disclosure will now be described. FIG. 5 illustrates example engageable survey interfaces rendered in accordance with at least some example embodiments of the present disclosure. Each engageable survey interface may enable user viewing of and/or engagement with a user survey data object. In this regard, an engageable survey interface may transform and/or provide access to one or more additional engageable survey interfaces associated with receiving a user survey data object, and/or engaging and/or otherwise interacting with various distinct portions of a user survey data object (e.g., a survey inquiry data object, a recommendations point, and/or the like). In some embodiments, each of the depicted engageable survey interfaces depicted and described are rendered via a display of a client device associated with the user to enable such engagement and/or interaction by the user.

In some embodiments, a client device executes and/or otherwise is operationally engaged to access a user-facing application that enables access to functionality provided by the item data object ranking system and/or user interfaces associated therewith. For example, in some embodiments, the client device executes a native user-facing application (e.g., an "app" associated with the item data object ranking system) installed and/or otherwise accessible to the client device. In other embodiments, the client device accesses a web-based user-facing application, for example by accessing a particular web resource via a browser application installed to and/or otherwise accessible via the client device. In this regard, the user-facing application embodied in hardware, software, firmware, and/or a combination thereof, may render the particular user interfaces described and/or otherwise provide access to the functionality of the item data object ranking system.

Specifically, as illustrated, FIG. 5 depicts a first engageable survey interface 502, a second engageable survey interface 504, a third engageable survey interface 506, and an item selection engagement interface 508. The user may engage and/or otherwise interact with each of the engageable survey interfaces in a particular defined order. For example, the user may interact with the first engageable survey interface 502 to request a user survey data object for engagement. In some such embodiment, for example, the first engageable survey interface 502 includes survey initiation button 502A. In this regard, the user may engage the survey initiation button 502A to transmit a user survey selection request to an item data object ranking system, for example embodied by survey-based recommendation apparatus 200, and receive a user survey data object generated by the item data object ranking system in response.

Upon receiving the user survey data object, the first engageable survey interface 502 transitions to the next engageable survey interface, for example the second engageable survey interface 504 as depicted. Alternatively or additionally, in some embodiments, the first engageable survey interface 502 is rendered by the client device in response to receiving a user survey data object. In some such embodiments, the survey initiation button 502A may cause transitioning to the next engageable survey interface, for example the second engageable survey interface 504.

In some embodiments, one or more engageable survey interface enables the user to interact with portions of the user survey data object. For example, engageable survey interfaces may be presented to enable engagement with each survey section data object, and content therein, in the defined order. For example, the second engageable survey interface 504 includes information embodying a first survey inquiry data object and associated inquiry response data objects for the first survey inquiry data object. Specifically, the second engageable survey interface 504 includes a survey inquiry data object element 504A and associated inquiry response data object elements 504B, 504C, 504D, and 504E. The survey inquiry data object element 504A includes text content embodying the first survey inquiry data object of a user survey data object (e.g., the first survey inquiry data object of a first survey section data object).

The depicted first survey inquiry data object includes text data requesting data associated with the shopping habits of the user associated with a user profile (e.g., requesting information regarding who the user shops for). The user may engage one of the inquiry response data object elements 504B, 504C, 504D, and/or 504E to select an inquiry response data object for the first survey inquiry data object. For example, in circumstances where the user shops only for themselves, the user may engage (e.g., by tapping, clicking, providing a voice command, and/or otherwise interacting with) the inquiry response data object element 504B. The selected inquiry response data object element may be visually distinguished, for example using color, size, a visual effect, and/or the like, as depicted by inquiry response data object element 504B. In other circumstances where the user shops for a spouse or partner, for example, the user may engage the inquiry response data object element 504C, and so on. Once the user is satisfied that they have selected the appropriate inquiry response data object element for their user profile, the user may engage a survey continuation element 504F to proceed to the next portion of the user survey data object (e.g., a next survey inquiry data object in the user survey data object).

Upon engagement of the survey continuation element 504F, the client device may generate and/or transmit survey engagement data associated with the first survey inquiry data object to a survey-based item personalization system for processing. For example, the response data may embody and/or otherwise represent the inquiry response data object selected by the user. As depicted, in some embodiments the survey engagement data is generated embodying the first inquiry response data object associated with the first inquiry response data object element 504B. For example, the survey engagement data may embody a numerical value representing the first inquiry response data object, the value of the first inquiry response data object (e.g., the value "Myself"), and/or other data embodying the first inquiry response data object selected by the user. In some such embodiments, upon transmission by the user device of the survey engagement data for the first survey inquiry data object, and/or receiving of data indicating the survey engagement data for the first survey inquiry data object was received and/or processed by the item data object ranking system, the user device transitions the second engageable survey interface to the third engageable survey interface 506. In this regard, the user may continue to interact with a second portion of the user survey data object (e.g., with a second survey inquiry data object in the first survey section data object of the user survey data object.

The third engageable survey interface 506 includes information embodying a second survey inquiry data object and associated inquiry response data objects for the second survey inquiry data object. Specifically, the third engageable survey interface 506 includes a survey inquiry data object element 506A and associated inquiry response data object elements 506B, 506C, 506D, and 506E. The survey inquiry data object element 506A includes text content embodying the second survey inquiry data object of a user survey data object (e.g., the second survey inquiry data object of a first survey section data object). As depicted, the second survey inquiry data object includes text data requesting data associated with the product preferences of the user associated with a user profile (e.g., requesting information regarding what types of oils the user utilizes). The user may engage one of the inquiry response data object elements 506B, 506C, 506D, and/or 506E to select an inquiry response data object for the second survey inquiry data object. In some such embodiments, the user may select multiple inquiry response data objects by engaging with multiple inquiry response data object elements 506B, 506C, 506D, and/or 506E. For example, in circumstances where the user wishes to indicate use of coconut oil, the user may engage (e.g., by tapping, clicking, providing a voice command, and/or otherwise interacting with) the inquiry response data object element 506B.

Similarly, as depicted, in circumstances where the user wishes to indicate use of olive oil as well, the user may engage the inquiry response data object element 506C. In a manner similar to that described above with respect to the selected first inquiry response data object with respect to inquiry response data object element 504B, the selected inquiry response data object elements may be visually distinguished, for example using color, size, a visual effect, and/or the like, as depicted by inquiry response data object element 504B and inquiry response data object element 504C. In other circumstances where the user wishes to indicate use of avocado oil, for example, the user may engage the inquiry response data object element 506C, and so on. Once the user is satisfied that they have selected the appropriate inquiry response data object element(s) for their user profile, the user may engage a survey continuation element 506F to proceed to the next portion of the user survey data object (e.g., a recommendations point in the user survey data object).

Upon engagement of the survey continuation element 506F, the client device may generate and/or transmit second survey engagement data associated with the second survey inquiry data object to an item data object ranking system for processing. For example, the second response data may embody and/or otherwise represent the inquiry response data object(s) selected by the user for the second survey inquiry data object. As depicted, in some embodiments the second survey engagement data is generated embodying the first inquiry response data object associated with the inquiry response data object element 506B and the second inquiry response data object associated with the inquiry response data object element 506C. For example, the survey engagement data may embody a numerical value representing the first inquiry response data object and the second inquiry response data object, the value of the first and second inquiry response data objects (e.g., a set or string including the values "Coconut oil" and "Olive oil"), and/or other data embodying the first inquiry response data object and second inquiry response data object selected by the user.

In some such embodiments, upon transmission by the user device of the second survey engagement data for the second survey inquiry data object, and/or receiving of data indicating the second survey engagement data for the second survey inquiry data object was received and/or processed by the item data object ranking system, the user device transitions the third engageable survey interface 506 to the item selection engagement interface 508. In this regard, the user may continue to interact with a third portion of the user survey data object (e.g., with a recommendations point in the first survey section data object of the user survey data object). In some embodiments, such as where the next step in the user survey data object is a recommendations point, the survey continuation element 506F may be configured to indicate that the following step is a continuation point (e.g., by configuring the color of the element to a predefined color indicating the recommendations point, to change the text of the element, and/or the like).

The item selection engagement interface 508 includes information embodying a recommendations point. At a recommendations point, the client device may request and/or receive an output ranked item data object set for displaying via an engageable survey interface. In some embodiments, for example, the client device requests the output ranked item data object set from an item data object ranking system upon reaching a recommendations point in a user survey data object. Additionally or alternatively, in some embodiments, once the recommendations point is reached, the client device receives the output ranked item data object set from the item data object ranking system for displaying via an engageable survey interface. In this regard, it should be appreciated that the output ranked item data object set may be received automatically or in response to user engagement.

An engageable survey interface associated with a recommendations point may include any number of sub-interfaces and/or interface elements associated with an output ranked item data object. For example, as depicted, the item selection engagement interface 508 includes item recommendation elements associated with each item data object in an output ranked item data object. As depicted, for example, the item selection engagement interface 508 includes item recommendation elements 508B-508I, each of which is associated with a different item data object embodying an output ranked item data object. Each item recommendation element may include any of a myriad of item information for the particular corresponding item data object, for example an item name, a seller name, a brand name, an item price, and/or the like. As depicted, for example, item recommendation element 508B is associated with an organic coconut oil product offered by seller Thrive Market, whereas item recommendation element 508C is associated with an organic liquid coconut oil offered by another seller. It should be appreciated that any of the information properties of an item data object, and/or associated with an item data object, may be represented by one or more sub-elements of an item recommendation element.

Additionally or alternatively, each item recommendation element is engageable to select the corresponding item data object for adding to a user-selected set of item data objects. For example, in some embodiments, each one of the item recommendation elements 508B-508I includes one or more sub-elements associated with selecting the corresponding item data object for inclusion in a user-selected set of item data objects. Additionally or alternatively, in some embodiments, the item recommendation element itself is configured such that engagement of the item recommendation element (e.g., a tap, click, or other interaction with the item recommendation interface) indicates selection of the corresponding item data object. In some embodiments, for example where the user-selected set of item data objects is maintained by an item data object ranking system, the client device transmits to the item data object ranking system one or more specially configured requests identifying a selected (or deselected) item data object based on user engagement to cause the item data object ranking system to add (or remove in the case of deselection) the selected item data object from the user-selected set of item data objects.

The item selection engagement interface 508 may provide any number of interface elements associated with the output ranked item data object set and/or user-selected set of item data objects. For example, in some embodiments, the item selection engagement interface 508 includes one or more interface elements representing an item price total for all items in the user-selected set of item data objects for the user profile. Additionally or alternatively, in some embodiments, the item selection engagement interface 508 includes purchase incentivization element 508A that represents information associated with an incentive for a purchase transaction. As depicted, for example, an incentive of free shipping is provided for a purchase transaction above a certain price total, and the purchase incentivization element 508A includes text data indicating the difference between the total price for the item data objects in the user-selected item list and a required total price to obtain the purchase incentive. It should be appreciated that the item data object ranking system may define parameters for any of a myriad of purchase incentive(s), associated price total(s), and/or the like.

Upon engagement of the survey continuation element 508J, one or more subsequent interfaces may be presented based on the user survey data object. For example, in circumstances where the recommendations point is followed by one or more additional survey inquiries, another engageable survey interface may be presented in a manner similar to those described with respect to the second engageable survey interface 504 and/or third engageable survey interface 506. Alternatively or additionally, in some embodiments where the recommendations point is the final part of a survey section data object, another engageable survey interface indicating progression to a second survey section data object may be presented. Alternatively or additionally, in circumstances where the recommendations point is the end of the user survey data object, a home screen interface may be presented that provides access to standard functionality associated with item searching and browsing.

In some embodiments, the client device configured to render the user interfaces as depicted and described communicates with one or more external computing devices for enabling the user interaction with the user survey data object. For example, in some embodiments, the client device communicates with the survey-based recommendation apparatus 200 that controls the order and/or sequence of the user survey data object as a user provides responses. The client device may generate and/or transmit survey engagement data representing inquiry response data object(s) selected by the user as the user indicates completion of interaction with a particular user interface corresponding to a survey inquiry data object. The survey-based recommendation apparatus 200, for example, may receive such survey engagement data and process such data. In some embodiments, for example, the survey-based recommendation apparatus 200 stores the survey engagement data, inquiry response data object(s) embodied therein, and/or corresponding user preferences data values associated with such survey engagement data. Alternatively or additionally still, in some embodiments, the survey-based recommendation apparatus 200 programmatically adjusts one or more aspects of the user survey data object based on the survey engagement data. For example, based on the survey engagement data corresponding to a particular survey inquiry data object, the survey-based recommendation apparatus 200 may programmatically generate and/or adjust the user survey data object. In this regard, for example, survey-based recommendation apparatus 200 controls the order and/or sequence of the user survey data object based on survey engagement data associated with previous survey inquiry data object(s) of the user survey data object. Such embodiments ensure the survey-based recommendation apparatus 200 may uniformly control the sequence and order associated with the user survey data object.

Example Data Processes of the Disclosure

Having described example systems, apparatuses, data, and user interfaces, example processes in accordance with the present disclosure will now be described. It should be appreciated that each of the processes may include various interacting computing devices, such that each process serves as a data flow between the various computing devices to facilitate the operations as depicted and described. Each of the processes, depicted as a data flow and/or flowchart, depicts an example computer-implemented process that may be performed by one or more of the apparatuses, systems, and/or devices described herein, for example utilizing one or more of the components thereof. The blocks indicating operations of each process may be arranged in any of a number of ways, including but not limited to that as depicted and described herein.

In some such embodiments, one or more operational blocks of any of the processes described herein occur in-between one or more blocks of another process, before one or more blocks of another process, and/or otherwise operates as a sun-process of a second process. Additionally or alternatively, any of the processes may include some or all of the steps described and/or depicted, including one or more optional operational blocks in some embodiments. With regard to the flowcharts illustrated herein, one or more of the depicted operational blocks may be optional in some, or all, embodiments of the disclosure. Optional operational blocks are depicted with broken (or "dashed") lines. Similarly, it should be appreciated that one or more of the operations of each flowchart may be combinable, replaceable, and/or otherwise altered as described herein.

FIG. 6A illustrates an example data flow diagram between a client device and an item data object ranking system embodying a process for customized user survey generation and processing in accordance with at least one example embodiment of the present disclosure. As depicted, FIG. 6A depicts an example data flow diagram including various data flow operations between a client device 654, for example executing one or more user-facing applications (e.g., embodied or supported by software, hardware, and/or firmware, including one or more associated supporting software systems such as an operating system, and/or the like), and an item data object ranking system 652 (e.g., providing customized user survey generation and/or processing functionality as described herein). In some such embodiments, the client device 654 and the item data object ranking system 652 are configured to interact with one another via one or more communication network(s), for example utilizing a request-and-response communication protocol, HTTP protocol, set of APIs, and/or the like. In this regard, the operations may be performed by, or through interaction between, the user-facing application executed on the client device 654 and a survey-based item personalization application executed on the item data object ranking system 652.

FIG. 6B illustrates a flowchart including example operations of an example process 600 for customized user survey generation and processing, specifically the process as depicted and described with respect to FIG. 6A in accordance with at least some example embodiments of the present disclosure. For purposes of understanding, the operations are depicted and described as performed by a survey-based recommendation apparatus 200, for example embodying the item data object ranking system 652. It should be appreciated that, for one or more of the described operations as depicted and described with respect to FIG. 6B, the survey-based recommendation apparatus may interact with one or more other computing devices, apparatuses, and/or the like, such as the client device 654.

The example process 600 may be embodied and/or implemented in any of a myriad of manners. For example, in some such embodiments, the process 600 embodies a computer-implemented method that may be executed by any of a myriad of computing devices, apparatuses, systems, and/or the like, as described herein. In some embodiments, the process 600 is embodied by computer program code stored on a non-transitory computer-readable medium of a computer program product configured for, upon execution, performing the computer-implemented process described. Alternatively or additionally, in some embodiments, the process 600 is performed by one or more specially configured computing devices, such as the survey-based recommendation apparatus 200 alone and/or in communication with one or more external devices. In this regard, in some such embodiments, the survey-based recommendation apparatus 200 is specially configured by computer program instructions stored thereon, for example in the memory 204 and/or another set of circuitry depicted and/or described herein, and/or otherwise accessible to the survey-based recommendation apparatus 200, for performing the operations as depicted and described.

The process 600 begins at optional operation 602. At optional operation 602, the survey-based recommendation apparatus 200 (for example, embodying the item data object ranking system 652) includes means, such as the survey creation circuitry 210, survey processing circuitry 212, communications circuitry 208, input/output circuitry 206, memory 204, and/or processor 202, to receive a user survey selection request. The user survey selection request may be received from a user device, for example in response to initiation of a particular user-facing application associated with the survey-based recommendation apparatus 200. In some embodiments, the user survey selection request is received at one or more particular stages of execution of the user-facing application associated with providing access to functionality of the survey-based recommendation apparatus 200. For example, the user survey selection request may be transmitted from the client device 654 to the survey-based recommendation apparatus 200 automatically upon a first initiation of the user-accessed application on the client device 654. Alternatively or additionally, for example in other embodiments, the user survey selection request may be transmitted from the client device 654 to the survey-based recommendation apparatus 200 upon completion of one or more pre-processing stages. For example, the user survey selection request may be received by the survey-based recommendation apparatus 200 once the user successfully creates a user profile associated with the survey-based recommendation apparatus 200 and is requesting access to other functionality associated with item purchasing and browsing for the first time and/or before having completed any previous purchase transaction(s).

In some embodiments, the user survey selection request is associated with a particular user profile identifier. For example, in some embodiments, the user of the client device 654 creates a new user profile, or logs into their existing user profile that is not associated with a fully onboarded state, via a user-facing application on the client device 654 to access functionality via the survey-based recommendation apparatus 200. In this regard, the client device 654 may perform one or more authentication process(es) with the survey-based recommendation apparatus 200 to begin an authenticated session associated with the corresponding user profile. For example, the client device 654 may provide, automatically or based on user input, user profile authentication credentials (e.g., a username and password, client device identifier, and/or the like) that may be authenticated to grant the user of the client device 654 access to the corresponding user profile. The user profile identifier for the user profile may be associated with any of a myriad of data maintained by the survey-based recommendation apparatus 200, for example user information, user preferences data, a user-selected set of item data objects, historical data regarding interactions with the survey-based recommendation apparatus 200 and/or other system(s), a favorited item list, and/or the like.

At operation 604, the survey-based recommendation apparatus 200 (for example, embodying the item data object ranking system 652) includes means, such as the survey creation circuitry 210, survey processing circuitry 212, communications circuitry 208, input/output circuitry 206, memory 204, and/or processor 202, to programmatically select a user survey data object from a set of user survey data objects. The set of user survey data objects may be maintained in one or more survey-based recommendation repositories of or accessible to the survey-based recommendation apparatus 200. In this regard, the survey-based recommendation apparatus 200 may select a particular predefined user survey data object from the set of user survey data objects based on one or more current statuses (e.g., a selected default selection), and/or based on any of a myriad of data processing operations.

In some embodiments, to select a user survey data object, the survey-based recommendation apparatus 200 is configured to generate the user survey data object by selecting particular survey inquiry data object(s) for associating with the user survey data object. In this regard, the selection of a user survey data object customized for a particular user may include programmatically generating the user survey data object, flow, and/or organization thereof. It should be appreciated that such programmatic generation may be performed based on any of a myriad of available data as described herein.

In some embodiments, the user survey data object is selected based on user constraints associated with the user profile identifier. For example, in some embodiments, the user survey data object is selected based on user preferences data associated with the user profile identifier, biographical information associated with a user profile identifier (e.g., a user location, age, family information, diet restrictions, product preferences, and/or the like) that define particular user constraints associated with the user. In some such embodiments, the user survey data object is selected based on unknown user preferences data associated with the user profile, for example such that the user survey data object includes survey inquiry data objects associated with obtaining data values corresponding to the various properties of unknown user preferences data.

Additionally or alternatively, in some embodiments, the user survey data object is selected based on technical information received from and associated with the client device utilized by the user and/or derivable as associated with request(s) from the client device. For example, the technical information associated with the client device may be identified from one or more request data object(s) (e.g., HTTP requests) received by the survey-based recommendation apparatus 200. Such technical information may include, for example and without limitation, a browser app identifier utilized to access the survey-based recommendation apparatus 200, a native application version identifier utilized to access the survey-based recommendation apparatus 200, a client device platform version (e.g., an OS identifier, a browser version identifier, and/or the like), client device IP address, and/or the like. It should be appreciated that any identifiable technical information associated with a particular client device may be utilized to select a particular user survey data object. Additionally or alternatively still, in some embodiments, one or more timestamps associated with a request for a user survey data object (e.g., a current timestamp, a request received timestamp, and/or the like) is processed to select the user survey data object.

Additionally or alternatively, in some embodiments, the user survey data object is selected based on various aspects associated with the user's access of the survey-based recommendation apparatus 200 and/or particular pages associated therewith. For example, in some embodiments, the survey-based recommendation apparatus 200 processes a source identifier indicating from which system, ad campaign, or otherwise how the user accessed the survey-based recommendation apparatus 200. Alternatively or additionally, in some embodiments, the survey-based recommendation apparatus 200 processes data indicating actions previously performed or data previously accessed by the user provided by the survey-based recommendation apparatus 200 (e.g., pages, searches, item data objects, searches, and/or other information provided by the survey-based recommendation apparatus 200). It should be appreciated that such data may be stored by the survey-based recommendation apparatus 200 and/or derivable from data stored by the survey-based recommendation apparatus 200, in response to previous user interactions by the user profile corresponding to the user with the survey-based recommendation apparatus 200.

The user survey data object may organized in any of a number of manners. For example, in this regard, it should be appreciated that the user survey data object may have any number of survey section data objects, survey inquiries, and/or recommendation points therein. The user survey data object may be generated associated with a particular user profile identifier, such as the particular user profile identifier for which a user survey selection request was received at optional operation 602. In this regard, the content of the user survey data object and/or organization of the content may be customized based on the particular user profile identifier and/or data associated therewith. In some embodiments, the survey-based recommendation apparatus 200 maintains a plurality of different user survey data objects, and generates a user survey data object embodying one of the plurality of different user survey data objects based on data associated with the particular user profile identifier.

At operation 604, the survey-based recommendation apparatus 200 (for example, embodying the item data object ranking system 652) includes means, such as the survey creation circuitry 210, survey processing circuitry 212, communications circuitry 208, input/output circuitry 206, memory 204, and/or processor 202, to cause rendering of an engageable survey interface based on the user survey data object. In some embodiments, the survey-based recommendation apparatus 200 causes rendering of the engageable survey interface to a client device, such as the client device 654, for example in response to an earlier user survey selection request. In some such embodiments, to cause rendering of the engageable survey interface, based on the user survey data object, the survey-based recommendation apparatus 200 transmits the user survey data object to the client device, for example as response data to the user survey selection request. The client device 654 subsequently may display the user survey data object, and/or a portion thereof, or otherwise utilize the user survey data object to render the engageable survey interface with particular information.

The engageable survey interface enables the user to engage with the user survey data object. In this regard, the engageable survey interface may be rendered and interacted with to step through the various points embodied by the user survey data object. The engageable survey interface in some embodiments enables the user to submit survey engagement data for one or more survey inquiries, and/or interact with an item recommendations list as described. For example, the engageable survey interface may be rendered to the client device including interface elements associated with a first survey inquiry data object of the user survey data object. As the user interacts with the engageable survey interface, such as to provide survey engagement data, subsequent engageable survey interfaces may be rendered for interacting with subsequent survey inquiries and/or recommendation points of the user survey data object as described herein.

It should be appreciated that, in some embodiments, the user survey data object, and/or a particular portion thereof such as a particular survey section data object of the user survey data object, is transmitted in its entirety to the client device 654. In some such embodiments, the data transmitted to enable the client device 654 to update the engageable survey interface and/or cause rendering of subsequent engageable survey interfaces as the user interacts with the user survey data object. For example, in embodiments where at least a survey section data object of the user survey data object is transmitted to the client device 654 to cause rendering of an engageable survey interface, the engageable survey interface may be rendered including content associated with a first survey inquiry data object, and once the user selects a particular inquiry response data object for the first survey inquiry data object, the engageable survey interface may be updated (or a second engageable survey interface rendered) for interacting with a second survey inquiry data object without subsequent requests transmitted to the survey-based recommendation apparatus 200.

At optional operation 608, the survey-based recommendation apparatus 200 (for example, embodying the item data object ranking system 652) includes means, such as the survey creation circuitry 210, survey processing circuitry 212, communications circuitry 208, input/output circuitry 206, memory 204, and/or processor 202, to receives, from the user device, a request for user preferences data associated with the particular user profile identifier. In some embodiments, the request for user preferences data is received from the client device 654. The request for user preferences data may be received together with or additional to the user survey selection request. In some embodiments, the user survey selection request further embodies a request for user preferences data, such that only a single request is received by the survey-based recommendation apparatus 200.

At optional operation 610, the survey-based recommendation apparatus 200 (for example, embodying the item data object ranking system 652) includes means, such as the survey creation circuitry 210, survey processing circuitry 212, communications circuitry 208, input/output circuitry 206, memory 204, and/or processor 202, to retrieve user preferences data associated with the particular user profile identifier, for example in response to the request for user preferences data. In some such embodiments, the survey-based recommendation apparatus 200 may query one or more repositories for the user preferences data associated with the particular user profile identifier. In this regard, the query may utilize the user profile identifier to identify user preferences data that specifically corresponds to the particular user profile identifier, such that the user preferences for the particular user profile identified by the user profile identifier may be processed.

In some embodiments, the user preferences data is utilized to generate the user survey data object. For example, if the user preferences data indicates one or more values have already been set for particular preferences and/or data properties, the user survey data object may be generated without survey inquiries associated with such particular preferences. Alternatively or additionally, in some embodiments, the user preferences data is provided for processing by the client device 654.

In this regard, at optional operation 612, the survey-based recommendation apparatus 200 (for example, embodying the item data object ranking system 652) includes means, such as the survey creation circuitry 210, survey processing circuitry 212, communications circuitry 208, input/output circuitry 206, memory 204, and/or processor 202, to transmit, to the user device, the user preferences data associated with the particular user profile identifier. The user preferences data may be provided as response data to the request for user preferences data and/or user survey selection request.

FIG. 7A illustrates a data flow diagram between a client device and an item data object ranking system embodying another process, or sub-process, for generating a personalized output ranked item data object set based on a customized user survey as part of customized user survey generation and processing in accordance with at least some example embodiments of the present disclosure. As depicted, FIG. 7A depicts an example data flow diagram including various data flow operations between the client device 654 and the item data object ranking system 652, for example as depicted and described with respect to FIG. 6A. It should be appreciated that, in this regard, the operations depicted in the data flow depicted and described with respect to FIG. 7A may be performed additional to those depicted and described with respect to FIG. 6A.

FIG. 7B illustrates a flowchart including example operations of the process, or sub-process, as depicted and described with respect to FIG. 7A in accordance with at least some example embodiments of the present disclosure. In this regard, for purposes of understanding, the operations are depicted and described as performed by the survey-based recommendation apparatus 200, for example embodying the item data object ranking system 652, in a similar manner to that depicted and described with respect to FIG. 6B.

The example process 700 may be embodied and/or implemented in any of a myriad of manners. For example, in some such embodiments, the process 700 embodies a computer-implemented method that may be executed by any of a myriad of computing devices, apparatuses, systems, and/or the like, as described herein. In some embodiments, the process 700 is embodied by computer program code stored on a non-transitory computer-readable medium of a computer program product configured for, upon execution, performing the computer-implemented process described. Alternatively or additionally, in some embodiments, the process 700 is performed by one or more specially configured computing devices, such as the survey-based recommendation apparatus 200 alone and/or in communication with one or more external devices. In this regard, in some such embodiments, the survey-based recommendation apparatus 200 is specially configured by computer program instructions stored thereon, for example in the memory 204 and/or another set of circuitry depicted and/or described herein, and/or otherwise accessible to the survey-based recommendation apparatus 200, for performing the operations depicted and described.

The process 700 begins by receiving survey engagement data for one or more survey inquiries. In some embodiments, the process 700 begins after one or more operational blocks of another process, for example after optional operation 612 as depicted and described with respect to the process 600. Additionally or alternatively, in some embodiments, flow continues to an operation of another process upon completion of the process 700. Alternatively or additionally still, in some other embodiments, the flow ends upon completion of the process 700.

At operation 702, the user engages the client device 654 to interact with the user survey data object. For example, in this regard, the user may interact with an engageable survey interface rendered via the client device 654 to provide survey engagement data for a currently displayed survey inquiry data object. The user may interact with the engageable survey interface to select and submit survey engagement data corresponding to a particular inquiry response data object, for example through engaging particular interface elements of the engageable survey interface as depicted and described with respect to FIG. 5.

At operation 704, the survey-based recommendation apparatus 200 (for example, embodying the item data object ranking system 652) includes means, such as the survey creation circuitry 210, survey processing circuitry 212, communications circuitry 208, input/output circuitry 206, memory 204, and/or processor 202, to receive survey engagement data generated in response to user engagement with the engageable survey interface. The survey engagement data may represent a selected or otherwise input inquiry response data object for the corresponding survey inquiry data object by a user associated with the user profile. In this regard, the received survey engagement data object is associated with a particular survey inquiry data object, for example the client device rendering the survey engagement interface may maintain the engageable survey interface together with data indicating which survey inquiry data object is currently being rendered for user engagement as the user provides survey engagement data associated with a set of survey inquiry data objects represented by the user survey data object.

In this regard, the survey engagement data may be transmitted associated with data identifying a particular survey inquiry data object linked to the survey engagement data. The survey engagement data may be associated with a particular user profile identifier that uniquely identifies the user profile utilized for submitting the survey engagement data. Additionally or alternatively, in some embodiments, the survey engagement data comprises or is received together with a survey inquiry data object identifier that uniquely identifies the survey inquiry data object associated with the survey engagement data. In some embodiments, the survey-based recommendation apparatus 200 receives the survey engagement data at a particular endpoint indicating the received data is survey engagement data for processing.

At optional operation 706, the survey-based recommendation apparatus 200 includes means, such as the survey creation circuitry 210, survey processing circuitry 212, communications circuitry 208, input/output circuitry 206, memory 204, and/or processor 202, to updates user preferences data associated with the particular user profile based on the survey engagement data. It should be appreciated that, in some embodiments, particular portions of user preferences data are associated with particular survey inquiries, such that survey engagement data for such survey inquiries are utilized to update those particular portions of the user preferences data. In this regard, the survey-based recommendation apparatus 200 may update one or more user preferences of the user preferences data to indicate particular value(s) based on the survey engagement data. For example, survey engagement data may be received for a survey inquiry data object that requests a user's preferred types of cooking oil, and the survey inquiry data object may be associated with a particular user preference having a value representing the preferred types of cooking oil for the user profile identifier corresponding to the user profile for the user. In this regard, value of the user preference representing the user's preferred types of cooking oil may be updated based on the survey engagement data received for the survey inquiry data object. It should be appreciated that, in some embodiments, the survey engagement data itself for some or all inquiry response data objects is stored as part of or additional to the user preferences data.

At optional operation 708, the survey-based recommendation apparatus 200 (for example, embodying the item data object ranking system 652) includes means, such as the survey creation circuitry 210, survey processing circuitry 212, communications circuitry 208, input/output circuitry 206, memory 204, and/or processor 202, to transmit data indicating the survey engagement data was processed. In some embodiments, the client device 654 may update an engageable survey interface in response to receiving such data. Alternatively, in other embodiments, the engageable survey interface may be updated (e.g., to proceed to a next survey inquiry data object and/or recommendations point) automatically without receiving such data.

The user may continue to engage the client device 654 for any number of survey inquiries. For example, in some embodiments, the user continues to provide survey engagement data utilizing the sub-process embodied by operations 702-708 for any number (or all) survey inquiries in a user survey data object provided to the client device 654. In this regard, the user may reach different points of the user survey data object as the user engages and/or submits survey engagement data for each user inquiry data object. It should be appreciated that, in some embodiments, the particular flow of survey inquiries of a user survey data object that is presented to a user via the client device 654 is dependent on the inquiry response data objects selected for one or more prior survey inquiries. For example, one or more survey inquiries may be skipped entirely and/or otherwise presented out of order based on an inquiry response data object for a previous survey inquiry data object.

In some embodiments, the user may continue to engage the client device 654 to provide survey engagement data such that the user reaches a recommendations point of the user survey data object. At optional operation 710, the survey-based recommendation apparatus 200 includes means, such as the survey creation circuitry 210, survey processing circuitry 212, communications circuitry 208, input/output circuitry 206, memory 204, and/or processor 202, to receive a user item recommendation request. The user item recommendation request may be received from the client device 654. For example, the client device 654 may transmit the user item recommendation request automatically upon reaching a recommendation point of the user survey data object. In other embodiments, the user of the client device 654 provides user input that originates or otherwise transmits the user items recommendation request. It should be appreciated that, in some embodiments, the survey-based recommendation apparatus 200 receives and/or processes the user items recommendation request via a second endpoint.

At operation 712, the survey-based recommendation apparatus 200 includes means, such as the survey creation circuitry 210, survey processing circuitry 212, communications circuitry 208, input/output circuitry 206, memory 204, and/or processor 202, to programmatically generate an output ranked item data object. In this regard, the output ranked item data object set may embody a particular set of available item data objects ordered or otherwise arranged such that the item data objects determined to be most likely to a particular user profile based on survey engagement data and/or other data associated with the user profile (e.g., user preferences data) are provided, and/or are provided in a particular order (e.g., with most recommended item data objects first). The output ranked item data object set includes one or more item data objects determined to be relevant to a particular user profile (or most relevant to the user profile) from a set of possible or otherwise available item data objects.

The output ranked item data object set may be programmatically generated utilizing any of a myriad of data. For example, in some embodiments, the output ranked item data object set is generated based on one or more survey engagement data received for one or more survey inquiry data objects, model-based score(s) generated utilizing one or more selected ranking models, and/or one or more user filters as described herein. In some embodiments, the output ranked item data object set is determined based on the survey engagement data associated with the user profile identifier for one or more survey inquiries and/or the user preferences data associated with the user profile identifier. For example, in some embodiments, the survey-based recommendation apparatus 200 generates a model-based score for a plurality of item data objects, and generates the output ranked item data object set embodying a ranking of such item data objects based on such model-based scores. In some embodiments, the output ranked item data object set is generated utilizing one or more ranking model(s), as described herein. A non-limiting example of generating an output ranked item data object set is depicted and described with respect to FIG. 8.

In some such embodiments, the output ranked item data object set is generated in real-time, such that the represented item data objects represent items determined available in real-time and/or determined based on real-time data. For example, the real-time received survey engagement data for one or more survey inquiries may be utilized to determine item data objects for recommending as determined to be available in real-time. Some such embodiments enable personalized item data object recommendation in real-time while performing efficiently and accurately.

It should be appreciated that the output ranked item data object set may be generated for a particular set of available item data objects. In some embodiments, the survey-based recommendation apparatus 200 maintains the set of available item data objects. In some such embodiments, for example, the survey-based recommendation apparatus 200 may embody and/or include an inventory management system that includes data indicating available item data objects. In some embodiments, the survey-based recommendation apparatus 200 communicates with an external item system that provides the available item data objects. The external item system may be communicated with at any of a myriad of timestamp intervals, for example to identify available item data objects in real-time, every minute, every hour, every day, and/or the like.

In some embodiments, additionally or alternatively, the survey-based recommendation apparatus 200 leverages caching and/or pre-computed ranked item data object(s). In this regard, cached ranked item data objects generated by one or more ranking model(s) may be stored for providing associated with the corresponding ranking model(s). In this regard, the pre-generated or cached ranked item data object(s) may be provided to improve the overall response time from the survey-based recommendation apparatus 200 to a client device upon submission of particular survey engagement data. In some embodiments, the cached and/or pre-generated ranked item data object(s) may be updated at predetermined time intervals (e.g., hourly, daily, and/or the like) or upon particular events and/or triggers (e.g., upon indication that an item inventory has been updated to include or remove one or more item data object(s)). It should be appreciated that cached or pre-generated ranked item data object(s) may be provided as an output ranked item data object set, or may be further processed as described herein (e.g., with respect to one or more other ranked item data object(s)) to generate the output ranked item data object set.

At operation 714, the survey-based recommendation apparatus 200 includes means, such as the survey creation circuitry 210, survey processing circuitry 212, communications circuitry 208, input/output circuitry 206, memory 204, and/or processor 202, to output the output ranked item data object. In some embodiments, at least a portion of the output ranked item data object set is output to a user-selected set of item data objects associated with the particular user profile identifier, for example those item data objects determined to be sufficiently relevant to the user profile identifier (e.g., ranked in certain positions such as top 5 most relevant item data objects, having model-based scores above a minimum score threshold, and/or the like). In some such embodiments, the item data objects represented in the portion of the output ranked item data object set are automatically selected for the user profile identifier. In this regard, the user may initiate a purchase transaction associated with the user-selected set of item data objects including the automatically selected item data objects without being required to perform additional user inputs to select such item data objects.

In some embodiments, the survey-based recommendation apparatus 200 outputs the output ranked item data object set to the client device. In some embodiments, for example, the survey-based recommendation apparatus 200 outputs the output ranked item data object set by transmitting the output ranked item data object set to the client device 654 for processing and/or rendering. In some such embodiments, the client device 654 receives the outputted output ranked item data object set for displaying to a user (e.g., via an engageable survey interface) and/or for further interaction.

For example, at operation 716, the user may engage the client device 654 to select one or more item data objects represented in the output ranked item data object. The user may select the one or more item data object(s) via engagement with an engageable survey interface rendered to the client device 654 in response to the output ranked item data object set outputted at operation 714. In this regard, for example, the user may select the item data object(s) representing items that the user is interested in purchasing via a purchase transaction. The user may subsequently submit such selected item data object(s) via interaction with one or more particular interface elements, for example as depicted and described with respect to FIG. 5.

At optional operation 718, the survey-based recommendation apparatus 200 includes means, such as the survey creation circuitry 210, survey processing circuitry 212, communications circuitry 208, input/output circuitry 206, memory 204, and/or processor 202, to receive user selection of at least one item data object from the output ranked item data object. For example, the client device 654 may transmit data embodying the user selection of at least one item data object from the output ranked item data object set in response to user input submitting such selection(s), for example via an item selection engagement interface rendered to the client device. In this regard, the survey-based recommendation apparatus 200 may receive item data object identifiers and/or other data that uniquely represent the at least one item data object selected by the user.

At optional operation 720, the survey-based recommendation apparatus 200 includes means, such as the survey creation circuitry 210, survey processing circuitry 212, communications circuitry 208, input/output circuitry 206, memory 204, and/or processor 202, to update a user-selected set of item data objects associated with the user profile identifier based on the user selection of at least one item data object. In this regard, for example, the survey-based recommendation apparatus 200 may add the at least one item data objects to the user-selected set of item data objects. The user-selected set of item data objects may embody a set of item data objects to be purchased by the user upon initiation of a purchase transaction. For example, in one example context, the user-selected set of item data objects embodies a virtual shopping cart (in the e-commerce context) to be purchased via an initiated purchase transaction upon initiation by the user.

It should be appreciated that various aspects of the item data object(s) embodied in the user-selected set of item data objects may be determined and/or provided for use in various functionality. For example, in some embodiments, a total price value is determinable from the user-selected set of item data objects to determine whether the user-selected set of item data objects satisfies particular criteria for receiving a purchase incentive (e.g., free shipping for purchasing more than a threshold amount). Alternatively or additionally, in some embodiments, the particular items in the user-selected set of item data objects are processed for purposes of providing one or more purchase incentives (e.g., a discount for having a particular item data object selected, or a combination of item data objects). It should be appreciated that, in some embodiments, the user may similarly update a user-selected set of item data objects to remove one or more previously selected item data objects.

The process 700 may be performed for any number of survey section data objects embodied in a user survey data object. In this regard, in a circumstance where a subsequent survey section data object is included in a user survey data object, the process 700 may be repeated for the subsequent survey section data object. In some embodiments, the data generated from and/or otherwise associated with a particular survey section data object is utilized only for processing the current survey section data object (e.g., for providing output ranked item data object(s) for the current survey section data object). Additionally or alternatively, in some embodiments, data generated from and/or otherwise associated with an earlier survey section data object is maintained for use in processing one or more subsequent survey section data objects.

FIG. 8 illustrates a flowchart including example operations of a process, or sub-process, for generating an output ranked item data object set based on a customized user survey as part of customized user survey generation and processing in accordance with at least some example embodiments of the present disclosure. In this regard, for purposes of understanding, the operations are depicted and described as performed by the survey-based recommendation apparatus 200, for example embodying the item data object ranking system 652.

The example process 800 may be embodied and/or implemented in any of a myriad of manners. For example, in some such embodiments, the process 800 embodies a computer-implemented method that may be executed by any of a myriad of computing devices, apparatuses, systems, and/or the like, as described herein. In some embodiments, the process 800 is embodied by computer program code stored on a non-transitory computer-readable medium of a computer program product configured for, upon execution, performing the computer-implemented process described. Alternatively or additionally, in some embodiments, the process 800 is performed by one or more specially configured computing devices, such as the survey-based recommendation apparatus 200 alone and/or in communication with one or more external devices. In this regard, in some such embodiments, the survey-based recommendation apparatus 200 is specially configured by computer program instructions stored thereon, for example in the memory 204 and/or another set of circuitry depicted and/or described herein, and/or otherwise accessible to the survey-based recommendation apparatus 200, for performing the operations depicted and described.

The process 800 begins at operation 802. In some embodiments, the process 800 begins after one or more operational blocks of another process, for example after operation 710 as depicted and described with respect to the process 700. In some embodiments, part of the process 800 begin at different points, for example operations 804-810 may occur as each survey engagement data is received, and operations 812-814 upon receiving a user items recommendation request. Additionally or alternatively, in some embodiments, flow continues to an operation of another process upon completion of the process 800, for example to operation 714 as depicted and described with respect to process 700. Alternatively or additionally still, in some other embodiments, the flow ends upon completion of the process 800.

At optional operation 802, the survey-based recommendation apparatus 200 includes means, such as the survey creation circuitry 210, survey processing circuitry 212, communications circuitry 208, input/output circuitry 206, memory 204, and/or processor 202, to identify the user preferences data and/or a set of response data associated with the particular user profile identifier. In this regard, the survey-based recommendation apparatus 200 may identify the set of response data and/or the user preferences data as survey engagement data is provided from a client device. Alternatively or additionally, in some embodiments, the survey-based recommendation apparatus 200 identifies the user preferences data and/or the set of response data by retrieving such data associated with the particular user profile identifier.

At operation 804, the survey-based recommendation apparatus 200 includes means, such as the survey creation circuitry 210, survey processing circuitry 212, communications circuitry 208, input/output circuitry 206, memory 204, and/or processor 202, to determine whether response data remains unprocessed. In this regard, the survey-based recommendation apparatus 200 may iterate through each response data in the set of response data. In some embodiments, the set of response data embodies survey engagement data for each survey inquiry data object in a particular survey section data object.

At operation 806, the survey-based recommendation apparatus 200 includes means, such as the survey creation circuitry 210, survey processing circuitry 212, communications circuitry 208, input/output circuitry 206, memory 204, and/or processor 202, to programmatically select a ranking model from a set of ranking models based on the survey engagement data. For example, as described, the survey-based recommendation apparatus 200 may map each inquiry response data object for a particular survey inquiry data object to a corresponding ranking model. In this regard, the survey-based recommendation apparatus 200 may identify the ranking model associated with the particular inquiry response data object represented by particular survey engagement data based on such mappings. The survey-based recommendation apparatus 200 may maintain any number of ranking models of various model types for use in generating item recommendations list(s).

As described herein, the ranking model may embody any of a myriad of model types, and may represent a particular model type determined to most accurately rank item data objects based on the corresponding survey engagement data. Similarly, as described, it should be appreciated that the ranking model may be trained by the survey-based recommendation apparatus 200, and/or another system that provides the ranking model to the survey-based recommendation apparatus 200 for use.

Additionally or alternatively, the ranking model may be trained based on item data objects selected and/or transacted by other user profiles that selected the particular inquiry response data object. For example, in some embodiments, a training set is built that comprises survey engagement data for particular user profile identifiers, and corresponding purchase and/or selected item data objects. In this regard, one or more ranking models may be trained for use in recommending particular item data objects in circumstances where a subsequent user profile selects the same inquiry response data object and/or set of inquiry response data objects. Additionally or alternatively, multiple ranking models are trained of different model types, and the ranking model determined to be most accurate based on one or more particular model accuracy metrics. Additionally or alternatively, the ranking model may comprise or be based on a plurality of sub-ranking models utilized to generate the final rankings for item data object(s).

It should be appreciated that, in other words, each ranking model is configured to arrange the same set of items into a different defined order. The defined order for such item data objects represents the relevance of such item data objects based on how well the input data (e.g., one or a plurality of survey engagement data) fits a training data set utilized to train the ranking model. It should be appreciated that ranking models may be trained for all item data objects, and/or for particular subsets of item data objects. For example, in some embodiments, different ranking models are trained for ranking the relevancy of distinct item categories (e.g., a first model for ranking snack item data objects, a second model for ranking gluten free item data objects, a third model for ranking keto item data objects, and/or the like). In this regard, ranking models may be trained based on any level of granularity desired for purposes of providing corresponding item data object recommendations.

At operation 808, the survey-based recommendation apparatus 200 includes means, such as the survey creation circuitry 210, survey processing circuitry 212, communications circuitry 208, input/output circuitry 206, memory 204, and/or processor 202, to programmatically generate, for each item data object of an item data object set, a model-based score based on the selected ranking model. For example, the particular ranking model selected at operation 806 may be used to generate the model-based score(s) for each item data object of the item data object set. In some such embodiments, the selected ranking model is utilized to generate model-based scores for any number of available item data object(s) identified by the survey-based recommendation apparatus 200, for example, via a locally maintained set of available item data objects and/or a set of item data objects retrieved from an eternal item system.

The model-based scores may be used to rank such item data object(s) in the item recommendations list based on the generated model-based scores. In this regard, the item data objects may be ordered and/or otherwise arranged into an item recommendations list that embodies an ordering of the item data object(s) based on their corresponding model-based scores, which may represent the relevancy of such item data object(s) for the particular user profile represented by the user profile identifier based on the survey engagement data and/or corresponding user preferences data. It should be appreciated that each ranking model may generate a different item recommendations list for a particular set of available item data object(s), for example based on the model type, training data used, and/or the like.

It should be appreciated that embodiments that utilize survey engagement data received from the user associated with a particular user profile enables the one or more model-based scores for various item data object(s) to be generated in real-time. In this regard, the survey engagement data may be received in real-time (e.g., from a client device) and processed in real-time to generate up-to-date and accurate recommended item data objects in real-time. Such embodiments provide advantages over systems that traditionally perform relevance determinations at predefined time intervals and/or otherwise cannot perform in real-time. For example, by generating real-time model-based score(s), embodiments of the present disclosure enable such model-based score(S) to be provided in real-time as well, as compared to other implementations that cannot provide such real-time services.

At optional operation 810, the survey-based recommendation apparatus 200 includes means, such as the survey creation circuitry 210, survey processing circuitry 212, communications circuitry 208, input/output circuitry 206, memory 204, and/or processor 202, to store the set of model-based scores in a recommended items scores list set. In this regard, the response-based item recommendations list set may include an item recommendations list generated for each inquiry response data object. In some embodiments, for example, the response-based item recommendations list set includes item recommendations lists for each survey engagement data corresponding to a survey inquiry data object in a particular survey section data object. In other embodiments, the response-based item recommendations list set includes item recommendations lists for each survey engagement data corresponding to a survey inquiry data object in any survey section data object.

At operation 812, the survey-based recommendation apparatus 200 includes means, such as the survey creation circuitry 210, survey processing circuitry 212, communications circuitry 208, input/output circuitry 206, memory 204, and/or processor 202, to programmatically identify a candidate ranked item data object set from the item data object set based on the model-based score(s). In some embodiments, the candidate ranked item data object set includes one or more item data objects set determined to be associated with model-based score(s) that satisfy a particular minimum recommendation score threshold. In this regard, in some embodiments, the candidate ranked item data object set corresponds to particular item data objects determined sufficiently likely to be of interest to the user associated with the user profile identifier. Additionally or alternatively, in some embodiments, the candidate ranked item data object set arranges and/or otherwise orders item data objects based on the model-based score(s) (e.g., so that higher-scored item data objects are provided first, or in other embodiments provided last).

In some embodiments, the candidate ranked item data object set is identified by merging each set of model-based scores in the recommended items scores list. In this regard, each model-based score for a particular item generated utilizing various selected ranking models may be utilized to generate a final model-based score utilized in identifying the candidate ranked item data object set. For example, in some embodiments, the survey-based recommendation apparatus 200 averages, for a particular item data object of the item data object set, the model-based scores for the particular item data object from each item model-based score from the various sets of model-based scores in the recommended items scores list set to obtain the final model-based scores for each particular item data object.

The candidate ranked item data object set may subsequently be generated based on the final model-based score for each item data object, such that the candidate ranked item data object set represents a defined order of the item data object(s) based on the final model-based scores representing the merged model-based scores for each particular item data object. In other embodiments, a final model-based score for one or more item data object(s) is determined based on a weighted average. In some such embodiments, the weights are determined based on the survey inquiry data object corresponding to the survey engagement data, the particular survey engagement data (e.g., which response was selected based on the survey inquiry data object, where response 1 and response 4 are weighted differently for example), the model type for the particular selected ranking model(s) used to generate the model-based score(s), the selected ranking model and/or data associated therewith (e.g., a determined accuracy of the ranking model) and/or the like. In some embodiments, multiple model-based scores are combined via ensembling to generate a final model-based score corresponding to a particular item data object. Alternatively or additionally, in some embodiments, a second trained model (e.g., an ensembling model, machine learning model, and/or the like) is trained to combine model-based score(s) for an item data object and generate a final model-based score for the item data object.

In some embodiments, the candidate ranked item data object set includes all item data object(s) from the item data object set arranged in a particular order based on the model-based scores. For example, the candidate ranked item data object set may include the item data objects of the item data object set arranged in descending order, such that the highest recommended item data objects appear first in the list. In this regard, in a circumstance where the candidate ranked item data object set is provided to a client device executing a user-facing application, the user-facing application may appropriately display all or a particular number of the highest ranked item data object(s) to the user. It should be appreciated that, in some embodiments, the number of highest ranked item data object(s) to be displayed is configurable via the user-facing application executed on the client device.

At optional operation 814, the survey-based recommendation apparatus 200 includes means, such as the survey creation circuitry 210, survey processing circuitry 212, communications circuitry 208, input/output circuitry 206, memory 204, and/or processor 202, to programmatically apply a user-defined filter to the candidate-ranked item data object set to generate an output ranked item data object set. In some embodiments, the user-defined filter is embodied or based on the user preferences data associated with the particular user profile identifier. For example, in one or more embodiments, the user preferences data is utilized to remove one or more item data objects that do not satisfy particular portion(s) of the user preferences data. In circumstances where user preferences data indicates the user associated with the user profile only purchases gluten free products, for example, the candidate ranked item data object set may be altered upon applying the user-defined filter to remove all non-gluten free products. It should be appreciated that, in this regard, one or more values for preferences embodied in the user preferences data may be utilized to remove different sets of item data objects that do not satisfy some or all of the user preferences data. The output ranked item data object set may subsequently be output, for example to a user via transmission to a corresponding user device.

FIG. 9 illustrates a flowchart including example operations of a process, or sub-process, for performing a purchase transaction of a user-selected item list as part of customized user survey generation and processing in accordance with at least some example embodiments of the present disclosure. In this regard, for purposes of understanding, the operations are depicted and described as performed by the survey-based recommendation apparatus 200, for example embodying the item data object ranking system 652.

The example process 900 may be embodied and/or implemented in any of a myriad of manners. For example, in some such embodiments, the process 900 embodies a computer-implemented method that may be executed by any of a myriad of computing devices, apparatuses, systems, and/or the like, as described herein. In some embodiments, the process 900 is embodied by computer program code stored on a non-transitory computer-readable medium of a computer program product configured for, upon execution, performing the computer-implemented process described. Alternatively or additionally, in some embodiments, the process 900 is performed by one or more specially configured computing devices, such as the survey-based recommendation apparatus 200 alone and/or in communication with one or more external devices. In this regard, in some such embodiments, the survey-based recommendation apparatus 200 is specially configured by computer program instructions stored thereon, for example in the memory 204 and/or another set of circuitry depicted and/or described herein, and/or otherwise accessible to the survey-based recommendation apparatus 200, for performing the operations depicted and described.

The process 900 begins at operation 902. In some embodiments, the process 900 begins after one or more operational blocks of another process. For example, the process 900 may begin at any point in time during user engagement of an engageable survey interface, such as after a user has added at least one item data object to their user-selected set of item data objects and after any of operations 702-720 as depicted and described with respect to the process 700. Additionally or alternatively, in some embodiments, flow continues to an operation of another process upon completion of the process 900, for example returning to an operation to continue engagement with a user survey data object. Alternatively or additionally still, in some other embodiments, the flow ends upon completion of the process 900.

At operation 902, the survey-based recommendation apparatus 200 includes means, such as the survey creation circuitry 210, survey processing circuitry 212, communications circuitry 208, input/output circuitry 206, memory 204, and/or processor 202, to receive, from the client device, a user request to initiate an item transaction. In some embodiments, the survey-based recommendation apparatus 200 receives the user request to initiate an item transaction in response to user interaction with an engageable survey interface. For example, in some embodiments, the user may interact with a button indicating checkout of the user-selected item data objects in the user-selected set of item data objects for the user profile identifier.

At operation 904, the survey-based recommendation apparatus 200 includes means, such as the survey creation circuitry 210, survey processing circuitry 212, communications circuitry 208, input/output circuitry 206, memory 204, and/or processor 202, to initiate a purchase transaction associated with each item represented in the user-selected set of item data objects. The purchase transaction embodies a purchase by the user profile identified by the user profile identifier of all items represented by item data objects in the user-selected set of item data objects. In some embodiments, initiation of the purchase transaction debits an account associated with the user profile, for example by debiting an amount equal to a total price of purchasing all items represented by the user-selected set of item data objects. Additionally or alternatively, in some embodiments, initiation of the purchase transaction begins an item distribution process involving delivering of the items represented in the user-selected set of item data objects to a user address associated with the user profile (e.g., a user-inputted home address or other shipping address). It should be appreciated that, in some embodiments, the survey-based recommendation apparatus 200 communicates with one or more external systems (e.g., payment processing systems, shipping systems, and/or the like) to initiate the purchase transaction.

At optional operation 906, the survey-based recommendation apparatus 200 includes means, such as the survey creation circuitry 210, survey processing circuitry 212, communications circuitry 208, input/output circuitry 206, memory 204, and/or processor 202, to provide data in response to the user request indicating completion of the purchase transaction. The survey-based recommendation apparatus 200 provides the data via a transmission to the client device associated with the user profile. In some embodiments, the data provided in response to the user request embodies a receipt of the purchase transaction initiated at operation 904. Additionally or alternatively, the data provided in response may include a purchase transaction identifier, completion datetime, and/or the like.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least one processor and at least one memory storing instructions that, with at least one processor, configure the apparatus to:
    receive a user survey selection request from a client device associated with a first user profile identifier;
    programmatically select a user survey data object from a set of user survey data objects based on user constraints associated with the first user profile identifier, wherein programmatically selecting the user survey data object from the set of user survey data objects based on the user constraints comprises identifying user preferences data associated with the first user profile identifier and programmatically generating the user survey data object including at least one survey inquiry data object associated with unknown user preferences data based on user preferences for at least one item data object that does not have an associated value;
    cause rendering of an engageable survey interface to the client device based on the selected user survey data object;
    receive survey engagement data generated in response to user engagement with the engageable survey interface, the survey engagement data comprising at least one inquiry response data object, wherein the at least one inquiry response data object correlates to a user engagement data training subset of a complete user engagement data corpus, the user engagement data training subset comprising interaction data representing at least one previously performed action associated with at least one other user profile identifier different from the first user profile identifier;
    programmatically select a ranking model linked to the at least one inquiry response data object from a set of ranking models, the ranking model comprising a machine learning model trained based on the user engagement data training subset;
    programmatically generate, for each item data object of an item data object set, a model-based score based at least on the selected ranking model linked to the at least one inquiry response data object;
    programmatically identify a candidate ranked item data object set from the item data object set based on the model-based scores;
    store a model-based score set comprising the model-based scores in a set of model-based score sets;
    generate the output ranked item data object set by merging each model-based score set in the set of model-based score sets and programmatically apply a user-defined filter to the candidate ranked item data object set to generate an output ranked item data object set, wherein the output ranked item data object set is altered based on the user preferences data associated with the first user profile identifier; and
    output the output ranked item data object set to the client device.

2. The apparatus according to claim 1, wherein the user survey data object comprises a first survey section data object comprising a first survey inquiry data object set and a second survey section data object comprising a second survey inquiry data object set, the apparatus further configured to:
    receive second survey engagement data associated with the second survey inquiry data object set, the second survey engagement data generated in response to user engagement with the engageable survey interface;
    programmatically select a second ranking model from a set of ranking models based on the survey engagement data;
    programmatically generate, for each item data object of a second item data object set, a second model-based score based on the selected ranking model;
    programmatically identify a second candidate ranked item data object set from the second item data object set based on the model-based scores;
    programmatically apply the user-defined filter to the second candidate ranked item data object set to generate an output ranked item data object set; and
    output the second output ranked item data object set to the client device.

3. The apparatus according to claim 1, wherein the apparatus receives a plurality of survey engagement data comprising the survey engagement data, each survey engagement data in the plurality of survey engagement data associated with the at least one survey inquiry data object of the user survey data object.

4. The apparatus according to claim 3, wherein the plurality of survey engagement data comprises first survey engagement data and second survey engagement data, and wherein the first survey engagement data is associated with a first ranking model of a first model type and the second survey engagement data is associated with a second ranking model of a second model type.

5. The apparatus according to claim 1, the apparatus further configured to
receive, from the client device, user selection of at least one item data object from the output ranked item data object set; and
update a user-selected set of item data objects associated with the first user profile identifier based on user selection of at least one item data object.

6. The apparatus according to claim 5, the apparatus further configured to:
receive, from the client device, a user request for item purchasing before completion of the user survey data object; and
initiate a purchase transaction associated with each item represented in the user-selected set of item data objects.

7. A computer-implemented method comprising:
receiving a user survey selection request from a client device associated with a first user profile identifier;
programmatically selecting a user survey data object from a set of user survey data objects based on user constraints associated with the first user profile identifier, wherein programmatically selecting the user survey data object from the set of user survey data objects based on the user constraints comprises identifying user preferences data associated with the first user profile identifier and programmatically generating the user survey data object including at least one survey inquiry data object associated with unknown user preferences data based on user preferences for at least one item data object that does not have an associated value;
causing rendering of an engageable survey interface to the client device based on the selected user survey data object;
receive survey engagement data generated in response to user engagement with the engageable survey interface, the survey engagement data comprising at least one inquiry response data object, wherein the at least one inquiry response data object correlates to a user engagement data training subset of a complete user engagement data corpus, the user engagement data training subset comprising interaction data representing at least one previously performed action associated with at least one other user profile identifier different from the first user profile identifier;
programmatically selecting a ranking model linked to the at least one inquiry response data object from a set of ranking models, the ranking model comprising a machine learning model trained based on a training data set corresponding to the user engagement data training subset;
programmatically generating, for each item data object of an item data object set, a model-based score based at least on the selected ranking model linked to the at least one inquiry response data object;
programmatically identifying a candidate ranked item data object set from the item data object set based on the model-based scores;
storing the model-based score set in a set of model-based score sets;
generating the output ranked item data object set by merging each model-based score set in the set of model-based score sets and programmatically applying a user-defined filter to the candidate ranked item data object set to generate an output ranked item data object set, wherein the output ranked item data object set is altered based on the user preferences data associated with the first user profile identifier; and
outputting the output ranked item data object set to the client device.

8. The computer-implemented method according to claim 7, wherein the user survey data object comprises a first survey section data object comprising a first survey inquiry data object set and a second survey section data object comprising a second survey inquiry data object set, the computer-implemented method further comprising:
receiving second survey engagement data associated with the second survey inquiry data object set, the second survey engagement data generated in response to user engagement with the engageable survey interface;
programmatically selecting a second ranking model from a set of ranking models based on the survey engagement data;
programmatically generating, for each item data object of a second item data object set, a second model-based score based on the selected ranking model;
programmatically identifying a second candidate ranked item data object set from the second item data object set based on the model-based scores;
programmatically applying the user-defined filter to the second candidate ranked item data object set to generate an output ranked item data object set; and
outputting the second output ranked item data object set to the client device.

9. The computer-implemented method according to claim 7, wherein programmatically selecting the user survey data object from the set of user survey data objects based on the user constraints associated with the first user profile identifier comprises:
identifying user preferences data associated with the first user profile identifier; and
programmatically generating the user survey data object including at least one survey inquiry data object associated with an unknown user preferences data based on the user preferences data.

10. The computer-implemented method according to claim 7, wherein the computer-implemented method further comprises a plurality of survey engagement data comprising the survey engagement data, each survey engagement data in the plurality of survey engagement data associated with the at least one survey inquiry data object of the user survey data object.

11. The computer-implemented method according to claim 7, the computer-implemented method further comprising:
receiving, from the client device, user selection of at least one item data object from the output ranked item data object set; and
updating a user-selected set of item data objects associated with the first user profile identifier based on user selection of at least one item data object.

12. A computer program product comprising at least one non-transitory computer readable storage medium having computer program code stored thereon that, in execution with at least one processor, configures the at least one processor for:
receiving a user survey selection request from a client device associated with a first user profile identifier;
programmatically selecting a user survey data object from a set of user survey data objects based on user constraints associated with the first user profile identifier, wherein programmatically selecting the user survey data object from the set of user survey data objects based on the user constraints comprises identifying user preferences data associated with the first user profile identifier and programmatically generating the user survey data object including at least one survey inquiry data object associated with unknown user preferences data based on user preferences for at least one item data object that does not have an associated value;

causing rendering of an engageable survey interface to the client device based on the selected user survey data object;

receive survey engagement data generated in response to user engagement with the engageable survey interface, the survey engagement data comprising at least one inquiry response data object, wherein the at least one inquiry response data object correlates to a user engagement data training subset of a complete user engagement data corpus, the user engagement data training subset comprising interaction data representing at least one previously performed action associated with at least one other user profile identifier different from the first user profile identifier;

programmatically selecting a ranking model linked to the at least one inquiry response data object from a set of ranking models, the ranking model comprising a machine learning model trained based on a training data set corresponding to the user engagement data training subset;

programmatically generating, for each item data object of an item data object set, a model-based score based at least on the selected ranking model linked to the at least one inquiry response data object;

programmatically identifying a candidate ranked item data object set from the item data object set based on the model-based scores;

storing the model-based score set in a set of model-based score sets;

generating the output ranked item data object set by merging each model-based score set in the set of model-based score sets and programmatically applying a user-defined filter to the candidate ranked item data object set to generate an output ranked item data object set, wherein the output ranked item data object set is altered based on the user preferences data associated with the first user profile identifier; and outputting the output ranked item data object set to the client device.

13. The computer program product according to claim 12, wherein the user survey data object comprises a first survey section data object comprising a first survey inquiry data object set and a second survey section data object comprising a second survey inquiry data object set, the computer program product further configured for:

receiving second survey engagement data associated with the second survey inquiry data object set, the second survey engagement data generated in response to user engagement with the engageable survey interface;

programmatically selecting a second ranking model from a set of ranking models based on the survey engagement data;

programmatically generating, for each item data object of a second item data object set, a second model-based score based on the selected ranking model;

programmatically identifying a second candidate ranked item data object set from the second item data object set based on the model-based scores;

programmatically applying the user-defined filter to the second candidate ranked item data object set to generate an output ranked item data object set; and outputting the second output ranked item data object set to the client device.

14. The apparatus according to claim 1, wherein the user survey data object comprises a first survey section data object and a second survey section data object, wherein the survey engagement data comprises a first inquiry response subset of the at least one inquiry response data object associated with the first survey section data object, and wherein the output ranked item data object set corresponds to the first survey section data object.

15. The apparatus according to claim 1, wherein the user survey data object comprises at least a survey inquiry data object associated with at least a first possible inquiry response data object and a second possible inquiry response data object, the first possible inquiry response data object linked to a first ranking model of the set of ranking models and the second possible inquiry response data object linked to a second ranking model of the set of ranking models, wherein the first linking model comprises a first machine learning model type and the second linking model comprises a second machine learning model type.

16. The apparatus according to claim 1, the apparatus further configured to:

access at least one data repository to query the at least one data repository based at least in part on the at least one inquiry response data object, wherein the user engagement data training subset is received in response to the query; and train the selected ranking model utilizing the user engagement data training subset.

17. The apparatus according to claim 1, wherein the user engagement training subset comprises data that is associated with a particular other user profile identifier of the at least one other user profile identifier and that indicates interaction with at least one item data object after completion by the at least one other user profile identifier of the user survey data object or a different user survey data object, each interaction representing a selection or transaction of the at least one item data object via a different user profile corresponding to the particular other user profile identifier, wherein each particular other user profile identifier of the at least other user profile identifier previously selected the at least one inquiry response data object.

18. The apparatus according to claim 1, wherein the ranking model is pre-trained based on the user engagement data training subset without including data associated with the first user profile identifier.

* * * * *